US011328428B2

(12) United States Patent
Kahlbaum

(10) Patent No.: US 11,328,428 B2
(45) Date of Patent: May 10, 2022

(54) TECHNOLOGIES FOR DETECTION OF OCCLUSIONS ON A CAMERA

(71) Applicant: Clarion Co., Ltd., Saitama (JP)

(72) Inventor: Robert Kahlbaum, Ypsilanti, MI (US)

(73) Assignee: Clarion Co., Ltd., Saitama (JP)

( * ) Notice: Subject to any disclaimer, the term of this patent is extended or adjusted under 35 U.S.C. 154(b) by 140 days.

(21) Appl. No.: 16/718,344

(22) Filed: Dec. 18, 2019

(65) Prior Publication Data

US 2021/0192745 A1 Jun. 24, 2021

(51) Int. Cl.
*G06T 7/13* (2017.01)
*G06T 7/12* (2017.01)
*G06T 7/174* (2017.01)
*B60R 1/00* (2022.01)
*G06T 3/40* (2006.01)

(52) U.S. Cl.
CPC ............ *G06T 7/13* (2017.01); *B60R 1/00* (2013.01); *G06T 3/4015* (2013.01); *G06T 7/12* (2017.01); *G06T 7/174* (2017.01); *B60R 2300/303* (2013.01); *B60R 2300/8053* (2013.01); *G06T 2207/30252* (2013.01)

(58) Field of Classification Search
CPC .. G06T 7/16; G06T 7/12; G06T 7/174; G06T 3/4015; G06T 2207/30252; B60R 1/00; B60R 2300/303; B60R 2300/8053
See application file for complete search history.

(56) References Cited

U.S. PATENT DOCUMENTS

| 6,757,109 | B2 * | 6/2004 | Bos | B60R 1/00 |
| | | | | 348/118 |
| 8,797,417 | B2 * | 8/2014 | Gayko | G06T 5/50 |
| | | | | 348/222.1 |
| 9,064,317 | B2 * | 6/2015 | Liu | G06T 7/11 |
| 9,390,329 | B2 * | 7/2016 | Shreve | G06V 10/42 |
| 9,992,388 | B2 * | 6/2018 | Romack | B60S 1/0848 |
| 10,525,937 | B2 * | 1/2020 | Zhao | B60S 1/0848 |
| 10,780,861 | B2 * | 9/2020 | Herman | G05D 1/0088 |
| 10,829,091 | B2 * | 11/2020 | Herman | B60S 1/56 |
| 10,836,313 | B2 * | 11/2020 | Nowakowski | B60R 1/00 |
| 10,867,201 | B2 * | 12/2020 | Evans | G06K 9/209 |
| 11,110,896 | B2 * | 9/2021 | Dalal | B08B 7/0042 |
| 2016/0140424 | A1 * | 5/2016 | Wang | G06V 30/194 |
| | | | | 382/156 |
| 2016/0284076 | A1 | 9/2016 | Jarman | |

(Continued)

FOREIGN PATENT DOCUMENTS

JP 2019032619 A 2/2019
WO 2019026785 2/2019

*Primary Examiner* — Gregory M Desire
(74) *Attorney, Agent, or Firm* — Barnes & Thornburg LLP

(57) ABSTRACT

Technologies for detecting occlusions on a camera of a vehicle by a compute device are disclosed. The compute device may receive one or more images from the camera. The compute device may analyze the images using various algorithms such as optical flow calculations, blurriness detection for portions of the image, edge detection, and circular artifact detection. The analysis may be used to determine the presence of occlusions on the camera, such as water drops, mud, dirt, etc. The compute device may send a command to clean the camera and/or may use the determined presence of occlusions as part analyzing images from the camera for a driver assist system, such as by ignoring portions of the image that are occluded.

17 Claims, 13 Drawing Sheets

(56) References Cited

U.S. PATENT DOCUMENTS

| | | |
|---|---|---|
| 2017/0109590 A1 | 4/2017 | Gehrke |
| 2017/0188002 A1* | 6/2017 | Chan .................. G06V 10/28 |
| 2018/0096474 A1 | 4/2018 | Guerreiro |
| 2019/0164271 A1 | 5/2019 | Herchenbach |
| 2020/0128215 A1* | 4/2020 | Wrisley .................. B60R 1/00 |

* cited by examiner

TECHNOLOGIES FOR DETECTION OF OCCLUSIONS ON A CAMERA

BACKGROUND

Sensors such as cameras are often used in vehicles for various purposes, such as providing assistance to a driver with a back-up camera or providing driver assistance such as lane-keeping technology. However, occlusions on the camera caused by water, dirt, or other obstacles can prevent the camera from capturing a clear image.

SUMMARY

According to one aspect of the disclosure, a compute device for detection of occlusions on a camera of a vehicle, the compute device comprising the camera; an occlusion detection module to receive one or more images from the camera of the vehicle; process the one or more images, wherein to process the one or more images comprises at least one of (i) determine a change in optical flow based on three images of the one or more images, (ii) determine one or more regions of at least one image of the one or more images that are out of focus, (iii) perform edge detection on at least one image of the one or more images, and (iv) detect one or more circular lens artifacts in at least one image of the one or more images; and determine, based on the one or more images, one or more occlusions on the camera of the vehicle.

In some embodiments, to process the one or more images comprises to process one image, wherein to determine, based on the one or more images, the one or more occlusions on the camera of the vehicle comprises to determine, based only on the one image from the camera, the one or more occlusions on the camera of the vehicle.

In some embodiments, to process the one or more images comprises to process no more than three images, wherein to determine, based on the one or more images, the one or more occlusions on the camera of the vehicle comprises to determine, based only on no more than three images from the camera, the one or more occlusions on the camera of the vehicle.

In some embodiments, to process the one or more images comprises to determine the change in optical flow based on the three images of the one or more images, wherein to determine the change in optical flow based on the three images comprises determine a first optical flow between a first image of the three images and a second image of the three images; determine a second optical flow between the second image and a third image of the three images; and determine a difference in optical flow magnitude between the first optical flow and the second optical flow for each of a plurality of pixels, wherein to determine, based on the one or more images, the one or more occlusions on the camera of the vehicle comprises to determine, based on the difference in optical flow magnitude between the first optical flow and the second optical flow for each of a plurality of pixels, the one or more occlusions on the camera of the vehicle.

In some embodiments, to process the one or more images further comprises to determine a stationary score for each of the plurality of pixels based on the first optical flow, wherein the stationary score for each of the plurality of pixels indicates a magnitude of optical flow in the first optical flow for the corresponding pixel, wherein to determine, based on the one or more images, the one or more occlusions on the camera of the vehicle comprises to determine, based on the stationary score for each of the plurality of pixels, the one or more occlusions on the camera of the vehicle.

In some embodiments, to process the one or more images comprises to determine the one or more regions of the at least one image that are out of focus, wherein to determine the one or more regions the at least one image that are out of focus comprises divide the at least one image into a plurality of subimages; and determine, for each of the plurality of subimages, whether the corresponding subimage is blurry, wherein to determine, based on the one or more images, the one or more occlusions on the camera of the vehicle comprises to determine, based on a determination of whether each of the plurality of subimages is blurry, the one or more occlusions on the camera of the vehicle.

In some embodiments, to process the one or more images comprises to perform edge detection on the at least one image of the one or more images, wherein to process the one or more images further comprises expand each of a plurality of edges identified in the at least one image during edge detection; and determine areas of at least one image without expanded edges, wherein to determine, based on the one or more images, the one or more occlusions on the camera of the vehicle comprises to determine, based on a determination of areas of the at least one image without expanded edges, the one or more occlusions on the camera of the vehicle.

In some embodiments, to process the one or more images comprises to detect one or more circular lens artifacts in the at least one image of the one or more images, wherein to detect one or more circular lens artifacts in the at least one image comprises perform edge detection of the at least one image; identify each of a plurality of contours defined by edge detection; and determine, for each of the plurality of contours, a ratio of a circle enclosing the corresponding contour to an area enclosed by the corresponding contour, wherein to determine, based on the one or more images, the one or more occlusions on the camera of the vehicle comprises to determine, based on a determination of the ratios for each of the plurality of contours.

In some embodiments, the compute device may further include selecting, based on one or more current conditions of the vehicle, one or more parameters of an occlusion detection algorithm.

In some embodiments, the compute device may further include applying a mask to the one or more images to block the sky.

According to one aspect of the disclosure, a method for detection of occlusions on a camera of a vehicle, the method comprising receiving, by a compute device, one or more images from the camera of the vehicle; processing, by the compute device, the one or more images, wherein processing the one or more images comprises at least one of (i) determining a change in optical flow based on three images of the one or more images, (ii) determining one or more regions of at least one image of the one or more images that are out of focus, (iii) performing edge detection on at least one image of the one or more images, and (iv) detecting one or more circular lens artifacts in at least one image of the one or more images; and determining, by the compute device and based on the one or more images, one or more occlusions on the camera of the vehicle.

In some embodiments, processing the one or more images comprises determining the change in optical flow based on the three images of the one or more images, wherein determining the change in optical flow based on the three images comprises determining, by the compute device, a first optical flow between a first image of the three images and a second image of the three images; determining, by the compute device, a second optical flow between the second image and a third image of the three images; and determining, by the compute device, a difference in optical flow magnitude between the first optical flow and the second optical flow for each of a plurality of pixels, wherein determining, based on the one or more images, the one or more occlusions on the camera of the vehicle comprises determining, based on the difference in optical flow magnitude between the first optical flow and the second optical flow for each of a plurality of pixels, the one or more occlusions on the camera of the vehicle.

In some embodiments, processing the one or more images comprises determining the one or more regions of the at least one image that are out of focus, wherein determining the one or more regions the at least one image that are out of focus comprises dividing, by the compute device, the at least one image into a plurality of subimages; and determining, by the compute device and for each of the plurality of subimages, whether the corresponding subimage is blurry, wherein determining, based on the one or more images, the one or more occlusions on the camera of the vehicle comprises determining, based on a determination of whether each of the plurality of subimages is blurry, the one or more occlusions on the camera of the vehicle.

In some embodiments, processing the one or more images comprises performing edge detection on the at least one image of the one or more images, wherein processing the one or more images further comprises expanding, by the compute device, each of a plurality of edges identified in the at least one image during edge detection; and determining, by the compute device, areas of at least one image without expanded edges, wherein determining, based on the one or more images, the one or more occlusions on the camera of the vehicle comprises determining, based on a determination of areas of the at least one image without expanded edges, the one or more occlusions on the camera of the vehicle.

In some embodiments, processing the one or more images comprises detecting one or more circular lens artifacts in the at least one image of the one or more images, wherein detecting one or more circular lens artifacts in the at least one image comprises performing, by the compute device, edge detection of the at least one image; identifying, by the compute device, each of a plurality of contours defined by edge detection; and determining, by the compute device and for each of the plurality of contours, a ratio of a circle enclosing the corresponding contour to an area enclosed by the corresponding contour, wherein determining, based on the one or more images, the one or more occlusions on the camera of the vehicle comprises determining, based on a determination of the ratios for each of the plurality of contours.

According to one aspect of the disclosure, one or more non-transitory computer-readable media comprising a plurality of instructions stored thereon that, when executed, causes a compute device to receive one or more images from a camera of a vehicle; process one or more images, wherein to process the one or more images comprises at least one of (i) determining a change in optical flow based on three images of the one or more images, (ii) determining one or more regions of at least one image of the one or more images that are out of focus, (iii) performing edge detection on at least one image of the one or more images, and (iv) detecting one or more circular lens artifacts in at least one image of the one or more images; and determine, based on the one or more images, one or more occlusions on the camera of the vehicle.

In some embodiments, to process the one or more images comprises to determine the change in optical flow based on the three images of the one or more images, wherein to determine the change in optical flow based on the three images comprises determine a first optical flow between a first image of the three images and a second image of the three images; determine a second optical flow between the second image and a third image of the three images; and determine a difference in optical flow magnitude between the first optical flow and the second optical flow for each of a plurality of pixels, wherein to determine, based on the one or more images, the one or more occlusions on the camera of the vehicle comprises to determine, based on the difference in optical flow magnitude between the first optical flow and the second optical flow for each of a plurality of pixels, the one or more occlusions on the camera of the vehicle.

In some embodiments, to process the one or more images comprises to determine the one or more regions of the at least one image that are out of focus, wherein to determine the one or more regions the at least one image that are out of focus comprises divide the at least one image into a plurality of subimages; and determine, for each of the plurality of subimages, whether the corresponding subimage is blurry, wherein to determine, based on the one or more images, the one or more occlusions on the camera of the vehicle comprises to determine, based on a determination of whether each of the plurality of subimages is blurry, the one or more occlusions on the camera of the vehicle.

In some embodiments, to process the one or more images comprises to perform edge detection on the at least one image of the one or more images, wherein to process the one or more images further comprises expand each of a plurality of edges identified in the at least one image during edge detection; and determine areas of at least one image without expanded edges, wherein to determine, based on the one or more images, the one or more occlusions on the camera of the vehicle comprises to determine, based on a determination of areas of the at least one image without expanded edges, the one or more occlusions on the camera of the vehicle.

In some embodiments, to process the one or more images comprises to detect one or more circular lens artifacts in the at least one image of the one or more images, wherein to detect one or more circular lens artifacts in the at least one image comprises perform edge detection of the at least one image; identify each of a plurality of contours defined by edge detection; and determine, for each of the plurality of contours, a ratio of a circle enclosing the corresponding contour to an area enclosed by the corresponding contour, wherein to determine, based on the one or more images, the one or more occlusions on the camera of the vehicle comprises to determine, based on a determination of the ratios for each of the plurality of contours.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements. The detailed description particularly refers to the accompanying figures in which.

DETAILED DESCRIPTION

Figure 1:
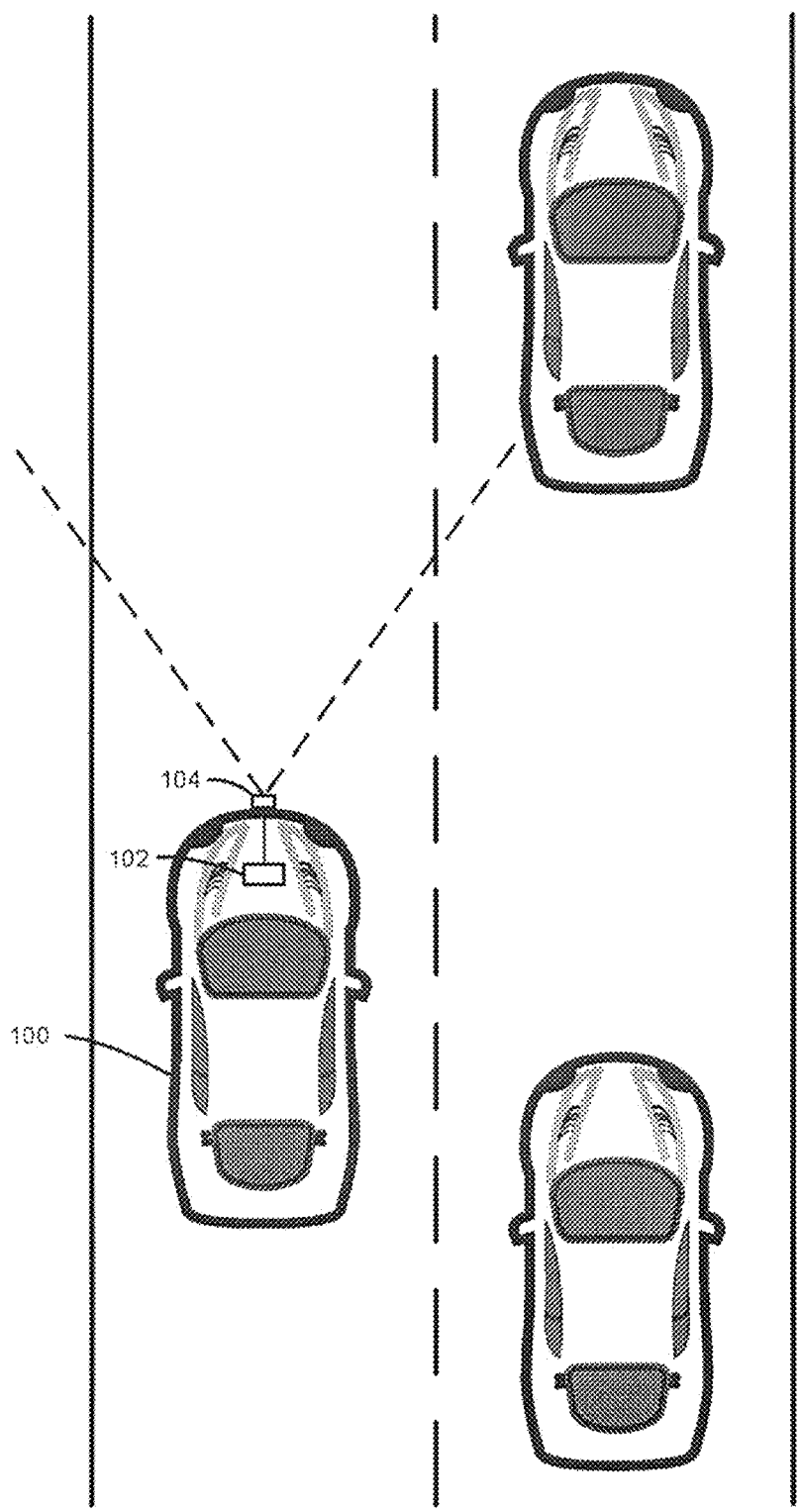
FIG. 1 is a simplified graphic of a vehicle including a compute device and a camera on a road.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a vehicle 100 may include a compute device 102 and a camera 104. The camera 104 is configured to provide a view of the surroundings of the vehicle, such as a front-facing camera. In use, the compute device 102 receives one or more images from the camera 104, such as the image shown in FIG. 2. The images may include one or more occlusions on the camera 104, such as the occlusions 202 shown in FIG. 2 caused by rain drops. The compute device 102 processes the images using an algorithm that can identify occlusions on the camera using a relative small number of images, such as one to three images. The compute device 102 may determine occlusions are present using any suitable algorithm, such as by tracking a change in the optical flow of the images, by determining regions in the images that are out of focus, by determining regions of the images without edges, and determining regions of the images with circular lens artifacts. After determining that occlusions are present, the compute device 102 may perform a task based on the presence of the occlusions, such as issuing a command to spray air or water on the occluded surface of the camera 104 or alerting a driver or passenger in the vehicle of the occlusion. The vehicle 100 may include a source of compressed air or cleaning fluid reservoir that is positioned to spray air or cleaning fluid on the camera 104 when issued such a command. In some embodiments, the compute device 102 may perform certain computer vision tasks at least partly based on the determined location of the occlusions, such as by ignoring the occluded parts of the image.

The occlusion detected may be due to any type of occlusion, such as a water drop, mud, dirt, organic matter such as insects, etc. The occlusion may be detected on any suitable surface, such as on a lens of the camera 104, on a cover of the camera 104, on a windshield of the vehicle 100, etc.

The camera 104 may be any suitable camera, and may contain one or more lenses and one or more image sensors. The image sensors of the camera 104 may be any suitable type of image sensor, such as a charge-coupled device (CCD) image sensor, a complementary metal-oxide-semiconductor (CMOS) image sensor, and/or other type of image sensor technology. The camera 104 may have any suitable frame rate, such as 10, 30, 60, or 120 frames per second. The camera 104 may have any suitable number of pixels, such as 1, 5, 10, or 20 megapixels. In some embodiments, the camera 104 may be part of the compute device 100, while in other embodiments it may be considered a separate component from the compute device 100. Although shown in FIG. 1 as being disposed near the front of the vehicle 100 and facing forward, it should be appreciated that the camera 104 may be placed in any suitable position and facing any suitable direction. For example, in some embodiments, a camera 104 may be placed on the side of the vehicle 100, on the rear of the vehicle 100, near the roof of the vehicle 100, in the interior of the vehicle 100, etc. Additionally or alternatively, in some embodiments, the camera 104 may be facing a different direction, such as facing to the right, left, or backwards. In the illustrative embodiment, the camera 104 is oriented level with the ground such that the horizon is in the center of images captured by the camera 104. Additionally or alternatively, the camera 104 may be tilted up or down from level with the ground. More generally, it should be appreciated that the camera can be oriented at any azimuthal angle from 0° to 360° relative to the vehicle 100 and/or can be oriented at any altitude angle from −90° to 90° relative to the vehicle 100. In some embodiments, the vehicle 100 may include more than one camera 104, such as one camera 104 on the front, one camera 104 on the left side, one camera 104 on the right side, and one camera 104 on the rear.

As shown in FIG. 1, the compute device 100 in the illustrative embodiment is disposed in the engine compartment of the vehicle 100. In some embodiments, the compute device 100 may be disposed in other parts of the vehicle, such as near the trunk, in the undercarriage, in the passenger compartment, etc. In some embodiments, the compute device 100 may be distributed in different areas of the vehicle 100. Additionally or alternatively, in some embodiments, some or all of the compute device 100 may be located somewhere other than the vehicle 100, such as a remote compute device 100 that may be located near the vehicle on the side of the road or a compute device 100 in a cloud data center.

Figure 3:
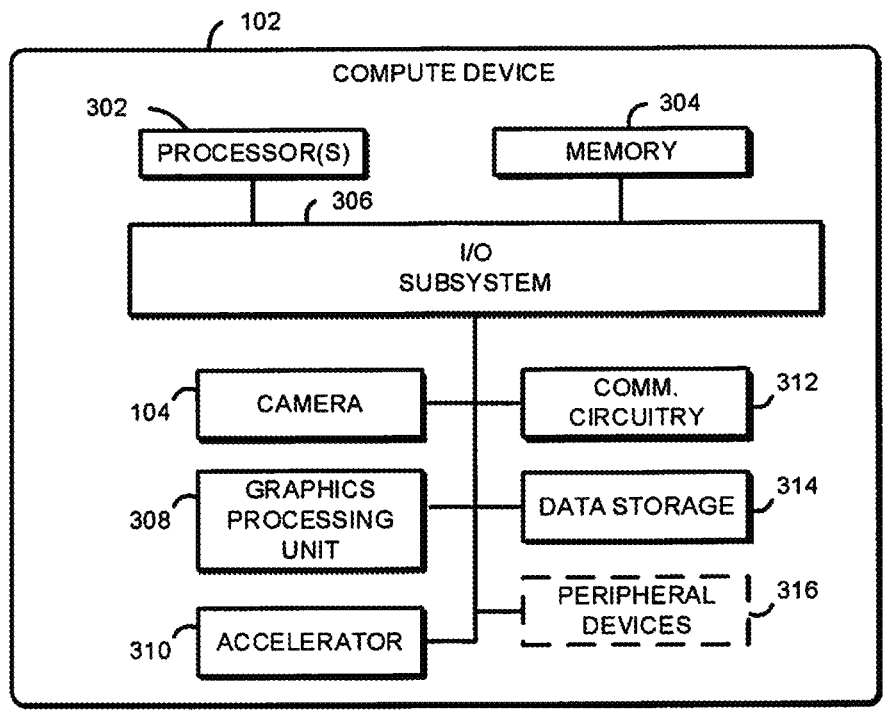
FIG. 3 is a simplified block diagram of at least one embodiment of the compute device of FIG. 1.

Referring now to FIG. 3, an illustrative compute device 102 may be embodied as any type of compute device capable of performing the functions described herein. For example, the compute device 102 may be embodied as or otherwise be included in, without limitation, an embedded computing system, a System-on-a-Chip (SoC), a multiprocessor system, a processor-based system, a server computer, a desktop computer, a sled or blade of a rack, a disaggregated computing system such as a rack scale architecture system, a smartphone, a cellular phone, a wearable computer, a tablet computer, a notebook computer, a laptop computer, a handset, a messaging device, a camera device a consumer electronic device, and/or any other computing device.

The illustrative compute device 102 includes the processor 302, a memory 304, an input/output (I/O) subsystem 306, the camera 104, a graphics processing unit (GPU) 308, an accelerator 310, communication circuitry 312, and data storage 314. In some embodiments, one or more of the illustrative components of the compute device 102 may be incorporated in, or otherwise form a portion of, another component. For example, the memory 304, or portions thereof, may be incorporated in the processor 302 in some embodiments.

The processor 302 may be embodied as any type of processor capable of performing the functions described herein. For example, the processor 302 may be embodied as a single or multi-core processor(s), a single or multi-socket processor, a digital signal processor, a microcontroller, or other processor or processing/controlling circuit.

Similarly, the memory 304 may be embodied as any type of volatile or non-volatile memory or data storage capable of performing the functions described herein. In operation, the memory 304 may store various data and software used during operation of the compute device 102 such as operating systems, applications, programs, libraries, and drivers. The memory 304 is communicatively coupled to the processor 302 via the I/O subsystem 306, which may be embodied as circuitry and/or components to facilitate input/output operations with the processor 302, the memory 304, and other components of the compute device 102. For example, the I/O subsystem 306 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 306 may form a portion of a system-on-a-chip (SoC) and be incorporated, along with the processor 302, the memory 304, and other components of the compute device 102 on a single integrated circuit chip.

The GPU 308 may be embodied as any device or circuitry (e.g., a programmable logic chip, a processor, etc.) configured to perform graphics-related computations (e.g., matrix multiplication, vector operations, etc.). The accelerator 310 may be embodied as any device or circuitry that is configured to perform particular computing operations. For example, the accelerator 310 may be a vision processing unit that is configured to perform operations related to machine vision, machine learning, and artificial intelligence. The accelerator 310 may be embodied as a programmable chip, an application specific integrated circuit (ASIC), a field programmable gate array (FPGA), and/or any combination of the above.

The communication circuitry 312 may be embodied as any type of interface capable of interfacing the compute device 102 with one or more remote devices or networks. The communication circuitry 312 may also be referred to or be embodied as a network interface controller (NIC). The communication circuitry 312 may be capable of interfacing with any appropriate cable type, such as an electrical cable or an optical cable. The communication circuitry 312 may be configured to use any one or more communication technology and associated protocols (e.g., controller-area network (CAN), local interconnect network (LIN), Ethernet, Bluetooth®, Wi-Fi®, WiMAX, near field communication (NFC), Omni-Path, etc.). Furthermore, in some embodiments, the communication circuitry 312 may be in a package separate from the processor 302, in a multi-chip package with the processor 302, or in a system-on-a-chip with the processor 302. In some embodiments, the compute device 102 may communicate with the camera 104 with use of the communication circuitry.

The data storage 314 may be embodied as any type of device or devices configured for the short-term or long-term storage of data. For example, the data storage 314 may include any one or more memory devices and circuits, memory cards, hard disk drives, solid-state drives, or other data storage devices.

Of course, in some embodiments, the compute device 102 may include additional components often found in a compute device 102, such one or more peripheral devices 316. The peripheral devices 316 may include a display, a keyboard, a mouse, speakers, etc. The display may be embodied as any type of display on which information may be displayed to a user of the compute device 102, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

Figure 4:
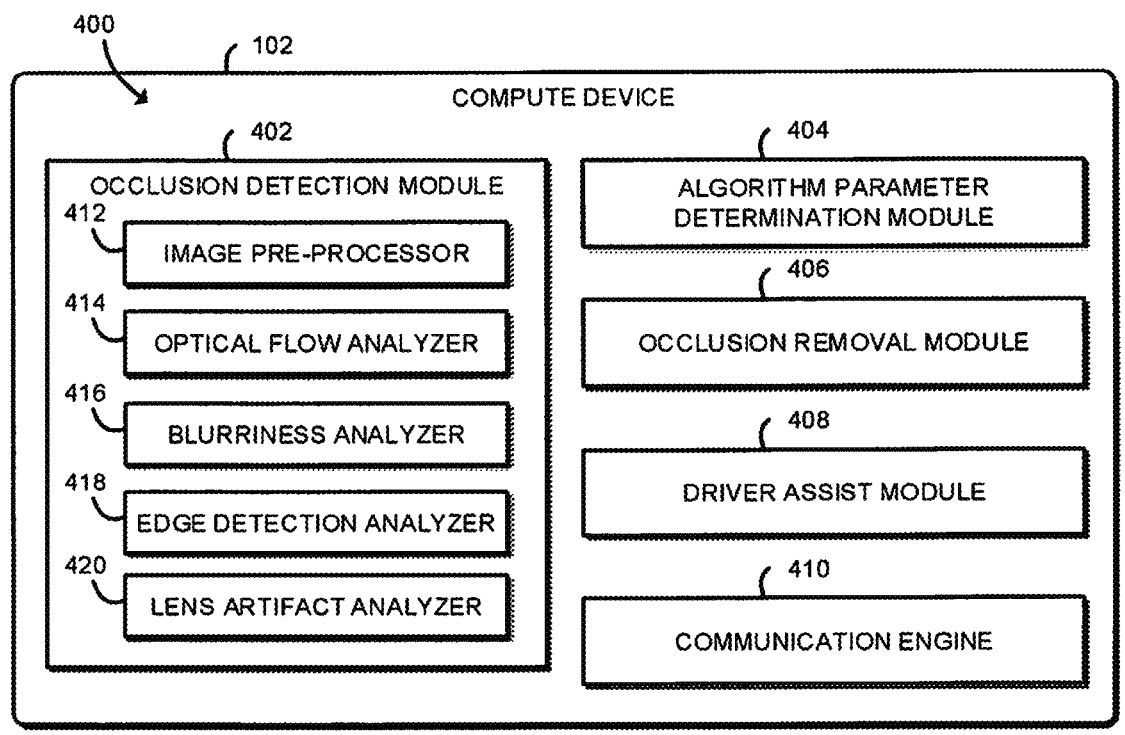
FIG. 4 is a block diagram of at least one embodiment of an environment that may be established by the compute device of FIG. 3.

Referring now to FIG. 4, in an illustrative embodiment, the compute device 102 establishes an environment 400 during operation. The illustrative environment 400 includes an occlusion detection module 402, an algorithm parameter determination module 404, an occlusion removal module 406, a driver assist module 408, and a communication engine 410. The various components of the environment 400 may be embodied as hardware, software, firmware, or a combination thereof. For example, the various components of the environment 400 may form a portion of, or otherwise be established by, the processor 302, the memory 304, or other hardware components of the compute device 102. As such, in some embodiments, one or more of the components of the environment 400 may be embodied as circuitry or collection of electrical devices (e.g., occlusion detection circuitry 402, algorithm parameter determination circuitry 404, occlusion removal circuitry 406, etc.). It should be appreciated that, in such embodiments, one or more of the circuits (e.g., the occlusion detection circuitry 402, the algorithm parameter determination circuitry 404, the occlusion removal circuitry 406, etc.) may form a portion of one or more of the processor 302, the memory 304, the I/O subsystem 306, the communication circuitry 312, the data storage 314, an application specific integrated circuit (ASIC), a programmable circuit such as a field-programmable gate array (FPGA), and/or other components of the compute device 102. For example, the occlusion detection circuitry 402 may be embodied as the processor 302 and associated instructions stored on the data storage 314 and/or the memory 304 that may be executed by the processor 302. Additionally, in some embodiments, one or more of the illustrative components may form a portion of another component and/or one or more of the illustrative components may be independent of one another. Further, in some embodiments, one or more of the components of the environment 400 may be embodied as virtualized hardware components or emulated architecture, which may be established and maintained by the processor 302 or other components of the compute device 102. It should be appreciated that some of the functionality of one or more of the components of the environment 400 may require a hardware implementation, in which case embodiments of components which implement such functionality will be embodied at least partially as hardware.

The occlusion detection module 402, which may be embodied as hardware (e.g., circuitry), firmware, software, virtualized hardware, emulated architecture, and/or a combination thereof as discussed above, is configured to detect occlusions in images from the camera 104. The occlusion detection module includes an image pre-processor 412, an optical flow analyzer 414, a blurriness analyzer 416, an edge detection analyzer 418, and a lens artifact analyzer 420. The occlusion detection module 402 is configured to use its various sub-modules to process images and determine whether occlusions are present in the images.

Figure 2:
FIG. 2 is one example picture from a camera showing occlusions.

The image pre-processor 412 is configured to pre-process images from the camera 104. The image pre-processor 412 may convert the images to grayscale. The image pre-processor 412 may also apply a mask to images. The mask may block certain regions of the images that should be ignored or otherwise treated differently during processing. For example, in some embodiments, the sky 204 as shown in FIG. 2 may be incorrectly interpreted as an occluded region. As such, the image pre-processor 412 may apply a mask to block out some or all of the sky 204. In some embodiments, the image pre-processor 412 may resize images prior to the images being analyzed by other components of the occlusion detection module 402.

The optical flow analyzer 414 is configured to analyze images using an optical flow algorithm. The optical flow analyzer 414 may calculate optical flows between two images using any suitable method, such as the Farnebeck method. It should be appreciated that the optical flow calculation provides an indication of a direction of apparent movement for objects in the field of view of the camera 104. For example, a lane dividing marker on the road may be determined to be moving at the same speed as a vehicle 100, while another vehicle that is being overtaken by the vehicle 100 with the camera 104 may be determined to be moving at a slower speed than the vehicle 100.

The optical flow analyzer 414 may determine a stationary score for each pixel of an optical flow calculation by comparing the magnitude of the optical flow vector for each pixel against a predetermined threshold. In some embodiments, the threshold may depend on the size of the image (either the original image or the image as resized by the image pre-processor 412). If the magnitude of the optical flow vector is above the predetermined threshold, then the optical flow analysis suggests the pixel is moving. If the magnitude of the optical flow vector is below the predetermined threshold, then the optical flow analysis suggests the pixel is not moving.

The optical flow analyzer may also determine a chaos score based on two optical flow calculations by determining a difference between the optical flow vector for each pixel. If the magnitude of the difference in optical flow vectors is above a predetermined threshold, then the optical flow analysis suggests the optical flow of the pixel is chaotic and does not accurately correspond to particular point in the real world but is instead is being distorted by an occlusion on the camera 104. If the magnitude of the difference in optical flow vectors is below the predetermined threshold, then the optical flow analysis suggests the pixel accurately corresponds to a particular point in the real world and is not occluded.

The blurriness analyzer 416 is configured to analyze images by determining regions of the images that are blurry. The blurriness analyzer 416 may divide the image being analyzed into several smaller subimages. For example, the blurriness analyzer 416 may divide the image into hundreds, thousands, or tens of thousands of smaller subimages. In the illustrative embodiment, each subimage is a square with a dimension of 10-15 pixels per side (for a total of 100 to 225 pixels per subimage). Additionally or alternatively, in some embodiments, each subimage may be a different shape such as a rectangle with any suitable dimensions, such as 5 to 100 pixels per side. The blurriness analyzer 416 may then calculates a blurriness score for each smaller subimage. The compute device 102 may calculate a blurriness score using any suitable calculation, such as by using the normalized Sobel method in the X and Y dimensions. If a subimage has a high blurriness score, then that subimage is likely to be occluded, such as by a water droplet that is blurring the image created on the camera 104.

The edge detection analyzer 418 is configured to analyze images by performing an edge detection algorithm on them. The edge detection analyzer 418 may apply any suitable edge detection algorithm, such as Canny edge detection. The edge detection analyzer 418 may expand the detected edges by a predetermined amount. For example, if the edges in block 802 are each 1 pixel wide, the edge detection analyzer 418 may expand each edge by 10 pixels in all directions. In other embodiments, the edge detection analyzer 418 may expand each edgy by a different number of pixels, such as anywhere from 1-100 pixels. As various features in the real world that are being imaged are likely to have a high density of edges (such as cracks in the road, road lines, road signs, trees, other vehicles, etc.), applying an edge detection algorithm and then expanding the edges will likely cover most or all of the imaged objects. However, occlusions are likely to lead to portions of an image that have no edges or have a low density of edges. The edge detection analyzer 418 may determine areas of the image that does not have any expanded edges or has an edge density below a predetermined threshold, which suggests the presence of an occlusion.

The lens artifact analyzer 420 is configured to analyze images by identifying circular lens artifacts. It should be appreciated that, at night, certain occlusions such as water drops may create circular or near-circular lens artifacts from various light sources such as headlights, streetlights, stop lights, etc. Detection of those artifacts can indicate an occlusion.

The lens artifact analyzer 420 may apply any suitable edge detection algorithm, such as Canny edge detection. The lens artifact analyzer 420 expands the edges by a predetermined amount. For example, if the edges in block 902 are each 1 pixel wide, the compute device 102 may expand each edge by 3 pixels in all directions. In other embodiments, the compute device 102 may expand each edgy by a different number of pixels, such as anywhere from 1-100 pixels. As artifacts caused by occlusions are likely to create or nearly create a full loop of edges, expanding the edges is likely to complete some of the loops, making detection easier.

The lens artifact analyzer 420 identifies contours in the edges. A contour is an edge that fully encloses an area. For example, an edge that loops around in a circle or near circle would form a contour. The lens artifact analyzer 420 calculates an area enclosed by each contour. The lens artifact analyzer 420 then discards area that are below a predetermined threshold. The lens artifact analyzer 420 calculates the area of the smallest circle that encloses each of the remaining contours and determines a ratio of the area of the determined circle to the area enclosed by the corresponding contour. A high ratio (i.e., a ratio close to one) indicates that the contour is nearly circular. A low ratio (i.e., a ratio close to zero) indicates that the contour is nearly circular. The lens artifact analyzer 420 discards areas where the determined ratio is less than a predetermined threshold. The threshold may be any suitable value, such as any value from 0.1-0.9. Areas with a ratio above the threshold indicate the presence of an occlusion.

The occlusion detection module 402 may use the various scores of pixel, subimages, or regions of the images to determine if occlusions are present. The occlusion detection module 402 may use one, some, or all of the indications provided by the various submodules. The occlusion detection module 402 may keep track of time-based parameters indicating the presence of occlusions in pixels, subimages, or regions of images, updating the time-based parameters as it receives new analysis of images from the submodules. It should be appreciated that, in some embodiments, the occlusion detection module 402 may detect occlusions based on as few as one, two, or three images from the camera 104.

The algorithm parameter determination module 404 is configured to determine parameters that can be used by the occlusion detection module 402 to detect occlusions. The occlusion detection module 402 may accesses training data. In the illustrative embodiment, the training data is embodied as labeled training data indicating where occlusions are in training images. It should be appreciated that the training data may include images without occlusions. Additionally or alternatively, in some embodiments, the training data may be include unlabeled training data of training images with and without occlusions where the occlusions are not labeled.

The occlusion detection module 402 determines algorithm parameters based on the training data. The occlusion detection module 402 may determine parameters for an optical flow occlusion detection algorithm, such as thresholds for a flow magnitude indicating a stationary pixel and for a difference in flow magnitude indicating a chaotic point. The occlusion detection module 402 may determine parameters for a blurriness occlusion detection algorithm, such as a threshold to use for a blurriness score for a region to have a detected occlusion. The occlusion detection module 402 may determine parameters for an edge detection-based occlusion detection algorithm, such as an amount to expand edges by and a threshold for edge density indicative of an occlusion. The compute device occlusion detection module 402 may determine parameters for a circular lens artifact occlusion detection algorithm, such as an amount to expand edges by, a threshold area enclosed by a contour to consider a candidate occlusion, and a threshold ratio between the area enclosed by a contour and the smallest circle that can surround the contour. The occlusion detection module 402 may also use the training data to train a convolutional neural network that can be used to predict where occlusions are. The occlusion detection module 402 then stores the algorithm parameters in the compute device 102 for later use. It should be appreciated that, in some embodiments, the occlusion detection module 402 may be located remote from the vehicle 100, and the parameters may be determined prior to operation of the vehicle 100.

The occlusion removal module 406 is configured to control a hardware component that can clean the camera 104, such as compressed air, a source of cleaning fluid, a wiper, etc. The occlusion removal module 406 may receive a command from the occlusion detection module 402 to clean the camera 104 or a certain portion of the camera 104 and then clean the camera 104 accordingly.

The driver assist module 408 is configured to provide certain driver assist functions, such as lane centering, automatic cruise control, lane changing, etc. The driver assist module 408 may analyze images from the camera 104 as part of providing driver assist functions, such as by determining a location of other vehicles or a location of lane markings. The driver assist module 408 is configured to analyze images from the camera 104 at least in part based on the occlusions detected by the occlusion detection module 402, such as by ignoring the regions of the image that are occluded.

The communication engine 410 is configured to control the communication circuitry 312. The communication engine 410 processes incoming messages from other compute devices as well as instructions from the local compute device 102 and outgoing messages from the local compute device 102. The communication engine 410 may be configured to use any one or more communication technology and associated protocols (e.g., CAN, LIN, Ethernet, Bluetooth®, Wi-Fi®, WiMAX, near field communication (NFC), etc.).

Figure 5:
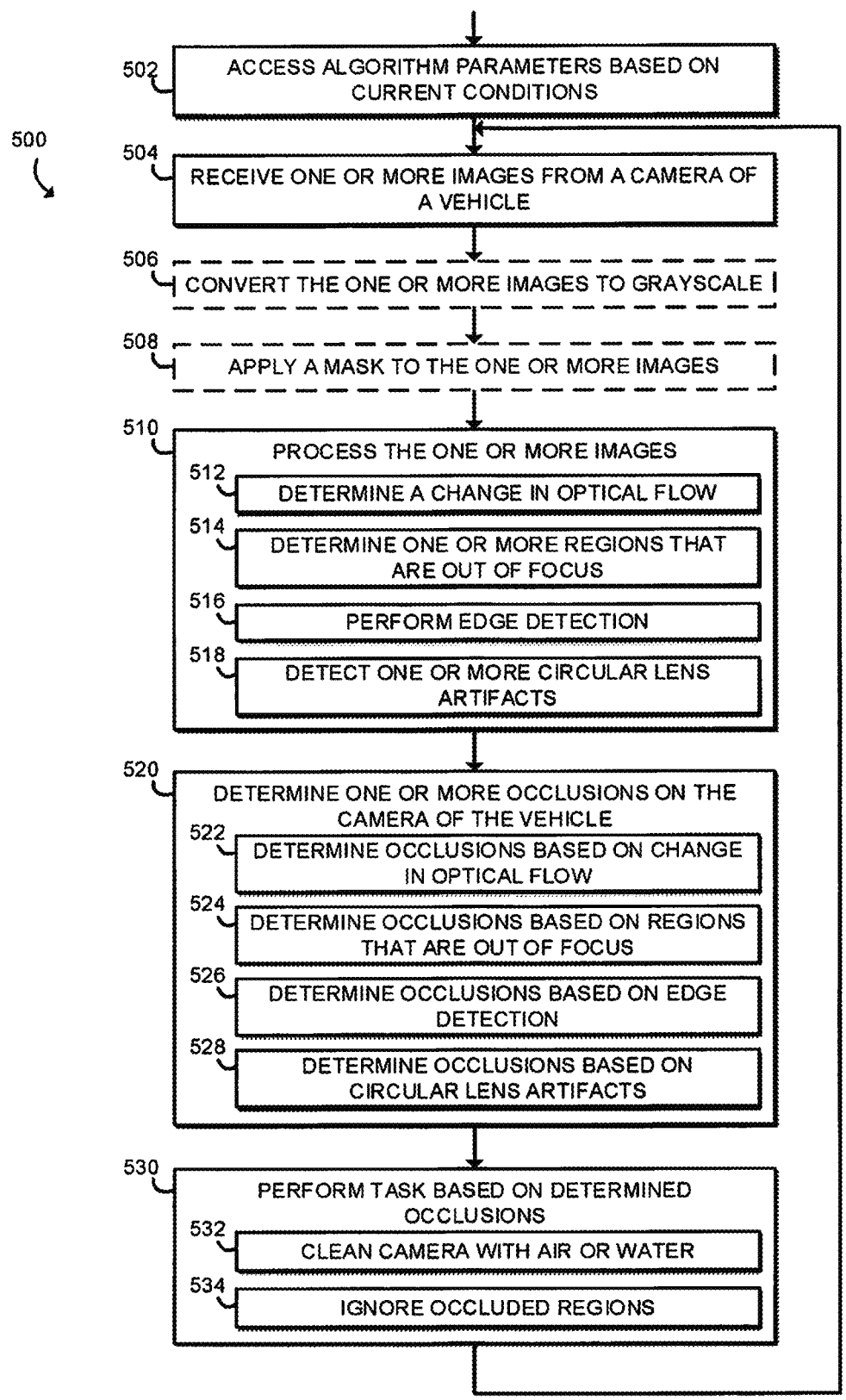
FIG. 5 is a simplified flow diagram of at least one embodiment of a method for detecting occlusions on a camera that may be executed by the compute device of FIG. 3.

Referring now to FIG. 5, in use, the compute device 100 may execute a method 500 for detecting occlusions on a camera 104 of a vehicle 100. The method 500 begins in block 502, in which the compute device 102 determines parameters for an algorithm to detect occlusions based on the current conditions. For example, the compute device 102 may access parameters based on a current weather condition (raining, snowing, cloudy, sunny, etc.), current road conditions (wet, dry, pavement type, etc.), current lighting conditions (direct sunlight, clear sky, overcast, nighttime, etc.), or any other relevant condition. The compute device 102 may access the parameters by retrieving them from storage, by receiving them from a remote compute device, or in any other suitable manner.

In block 504, the compute device 102 receives one or more images from a camera 104 of a vehicle 100. In the illustrative embodiment, the compute device 102 receives a series of consecutive images from the camera 104 that are generated at a particular framerate. For example, if the camera 104 generates images at a rate of 30 frames per second, the compute device 102 may receive an image from the camera 104 about every 33 milliseconds.

In the illustrative embodiment, the compute device 102 converts the one or more images to grayscale in block 506. Additionally or alternatively, the compute device 102 may proceed with processing color images or the images may already be grayscale.

In block 508, in some embodiments, the compute device 102 applies a mask to the one or more images. The mask may block certain regions of the one or more images that should be ignored or otherwise treated differently during processing. For example, in some embodiments, the sky 204 as shown in FIG. 2 may be interpreted as an occluded region. As such, the compute device 102 may apply a mask to block out some or all of the sky 204.

In block 510, the compute device 102 processes the one or more images by applying an algorithm to detect occlusions on the camera 104 shown in the one or more images. The compute device 102 may process the images by determining a change in the optical flow in block 512, as described in more detail below in regard to FIG. 6. The compute device 102 may process the images by determining one or more regions that are out of focus in block 514, as described in more detail below in regard to FIG. 7. The compute device 102 may process the images based on edge detection in block 516, as described in more detail below in regard to FIG. 8. The compute device 102 may process the images by detecting one a change in the optical flow in block 518, as described in more detail below in regard to FIG. 9. It should be appreciated that, in various embodiments, the compute device 102 may use any combination of the approaches described in blocks 512-518 and FIGS. 6-9.

In block 520, the compute device 102 determines one or more occlusions on the camera 104 of the vehicle 100 based on the processing of the images in block 510. The compute device 102 may determine occlusions are present based on a change in the optical flow in block 522. For example, if a pixel or region of the one or more images has a stationary score that is below a predetermined threshold or a chaos score that is above a predetermined threshold, that pixel or region of the one or more images may be determined to be occluded. The stationary score and chaos score are described in more detail below in regard to FIG. 6.

The compute device 102 may determine that occlusions are present based on a blurriness of regions of the one or more images in block 524. For example, if a time-based blurriness score corresponding to a subimage of the one or more images is above a predetermined threshold, that subimage may be determined to be occluded. The time-based blurriness score is described in more detail below in regard to FIG. 7.

The compute device 102 may determine that occlusions are present based on edges detected in the one or more images in block 526. For example, if there is a region that does not have any edges or only have density of edges that is below a predetermined threshold, that region may be determined to be occluded. Analysis of the edge detection is described in more detail below in regard to FIG. 8.

The compute device 102 may determine that occlusions are present based on the presence of circular lens artifacts in block 528. For example, if a time-based circular artifact score for a certain region is above a threshold, that region may be determined to be occluded. The time-based circular artifact score is described in more detail below in regard to FIG. 9.

In block 530, the compute device 102 may perform a task based on the determined occlusions. For example, in block 532, the compute device may send a command to clean the camera 104 with air or water. In some embodiments, the compute device 102 may perform certain computer vision tasks at least partly based on the determined location of the occlusions in block 534, such as by ignoring the occluded parts of the image. The method 500 then loops back to block 504 to receive more images from the camera 104.

Figure 6:
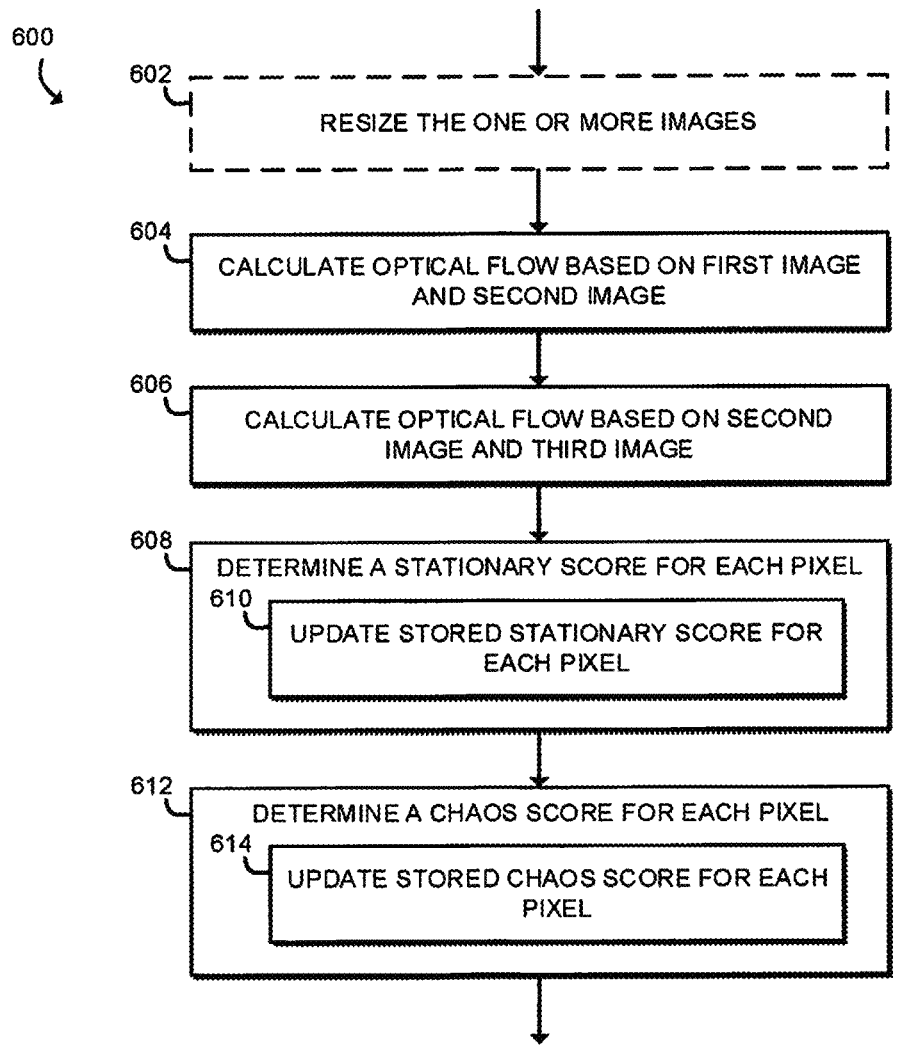
FIG. 6 is a simplified flow diagram of at least one embodiment of a method for processing an image using differences in optical flow that may be executed by the compute device of FIG. 3.

Referring now to FIG. 6, the compute device 102 may perform a method 600 for analyzing one or more images using an optical flow measurement. The method 600 begins in optional block 602 in which the compute device 102 resizes the one or more images. The compute device 102 may resize the one or more images to make the image processing faster or more efficient.

In block 604, the compute device 102 calculates an optical flow based on a first image and a second image of the one or more images. In the illustrative embodiment, the first image and the second images are consecutive images received from the camera 104. Additionally or alternatively, in some embodiments, the first and second image may not be consecutive images received from the camera 104. The optical flow may be calculated using any suitable method, such as the Farnebeck method. It should be appreciated that the optical flow calculation provides an indication of a direction of apparent movement for objects in the field of view of the camera 104. For example, a lane dividing marker on the road may be determined to be moving at the same speed as a vehicle 100, while another vehicle that is being overtaken by the vehicle 100 with the camera 104 may be determined to be moving at a slower speed than the vehicle 100.

In block 606, the compute device 102 calculates an optical flow based on the second image and a third image of the one or more images. In the illustrative embodiment, the second image and the first images are consecutive images received from the camera 104 (and the first, second, and third images are all consecutive). Additionally or alternatively, in some embodiments, the second and third image may not be consecutive images received from the camera 104.

In block 608, the compute device 102 determines a stationary score for each pixel of the two optical flow calculations by comparing the magnitude of the optical flow vector for each pixel against a predetermined threshold. In some embodiments, the threshold may depend on the size of the image (either the original image or the image as resized on block 602). If the magnitude of the optical flow vector is above the predetermined threshold, then the optical flow analysis suggests the pixel is moving. If the magnitude of the optical flow vector is below the predetermined threshold, then the optical flow analysis suggests the pixel is not moving.

In block 610, the compute device 102 may update a time-based stationary score that is stored in the compute device 102 for each pixel. If the magnitude of the optical flow is below a predetermined threshold, then the time-based stationary score is increased by a predetermined amount. If the magnitude of the optical flow is above the predetermined threshold, then the time-based stationary score is decreased by a predetermined amount. In some embodiments, the predetermined amount that the time-based stationary score is changed by may depend on the size of the image (either the original image or the image as resized on block 602). The compute device 102 may impose a maximum and a minimum value on the time-based stationary score in order to prevent reacting slowly to future changes. It should be appreciated that, in some embodiments, a stationary score may be determined based on a single optical flow measurement (i.e., based on only two images).

In block 610, the compute device 102 determines a chaos score based on the two optical flow calculations by determining a difference between the optical flow vector for each pixel. If the magnitude of the difference in optical flow vectors is above a predetermined threshold, then the optical flow analysis suggests the optical flow of the pixel is chaotic and does not accurately correspond to particular point in the real world but is instead is being distorted by an occlusion on the camera 104. If the magnitude of the difference in optical flow vectors is below the predetermined threshold, then the optical flow analysis suggests the pixel accurately corresponds to a particular point in the real world and is not occluded.

In block 612, the compute device 102 may update a time-based chaos score that is stored in the compute device 102 for each pixel. If the magnitude of the difference in optical flow is below a predetermined threshold, then the time-based chaos score is decreased by a predetermined amount. If the magnitude of the difference in the optical flow is above the predetermined threshold, then the time-based chaos score is increased by a predetermined amount. In some embodiments, the predetermined amount that the time-based chaos score is changed by may depend on the size of the image (either the original image or the image as resized on block 602). The compute device 102 may impose a maximum and a minimum value on the time-based chaos score in order to prevent reacting slowly to future changes.

It should be appreciated that the stationary score, the time-based stationary, the chaos score, and/or the time-based chaos score may be used to determine the presence of an occlusion in block 522 of the method 500 shown in FIG. 5, such as by comparing the various scores to a predetermined threshold. It should be appreciated that, after the initial optical flow and differences in optical flow is determined, both the optical flow and the difference in optical flow may be updated based on one new image by analyzing the new image together with one or two previous images.

Figure 7:
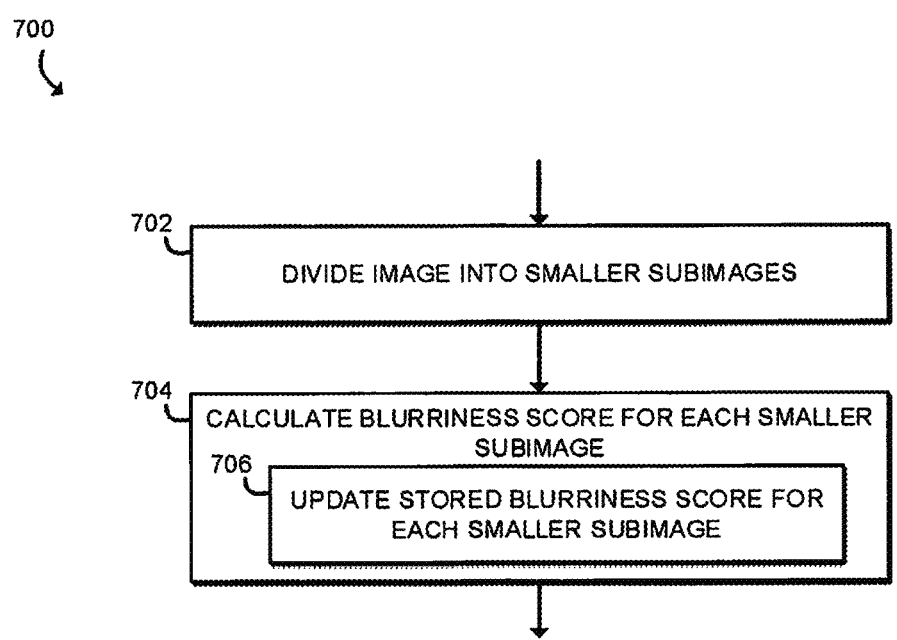
FIG. 7 is a simplified flow diagram of at least one embodiment of a method for processing an image by analyzing blurriness that may be executed by the compute device of FIG. 3.

Referring now to FIG. 7, in use, the compute device 102 may perform a method 700 for analyzing one or more images using a blurriness calculation. The method 700 begins in block 702 in which the compute device 102 divides the image being analyzed into several smaller subimages. For example, the compute device 102 may divide the image into hundreds, thousands, or tens of thousands of smaller subimages. In the illustrative embodiment, each subimage is a square with a dimension of 10-15 pixels per side (for a total of 100 to 225 pixels per subimage). Additionally or alternatively, in some embodiments, each subimage may be a different shape such as a rectangle with any suitable dimensions, such as 5 to 100 pixels per side.

In block 704, the compute device 102 calculates a blurriness score for each smaller subimage. The compute device 102 may calculate a blurriness score using any suitable calculation, such as by using the normalized Sobel method in the X and Y dimensions. If a subimage has a high blurriness score, then that subimage is likely to be occluded, such as by a water droplet that is blurring the image created on the camera 104.

In block 706, the compute device 102 may update a time-based blurriness score that is stored in the compute device for each pixel. If the blurriness score is below a predetermined threshold, then the time-based blurriness score is decreased by a predetermined amount. If the blurriness score is above the predetermined threshold, then the time-based blurriness score is increased by a predetermined amount. The compute device 102 may impose a maximum and a minimum value on the time-based blurriness score in order to prevent reacting slowly to future changes.

It should be appreciated that the blurriness score and/or the time-based blurriness score may be used to determine the presence of an occlusion in block 524 of the method 500 shown in FIG. 5, such as by comparing the blurriness score and/or the time-based blurriness score to a predetermined threshold.

Figure 8:
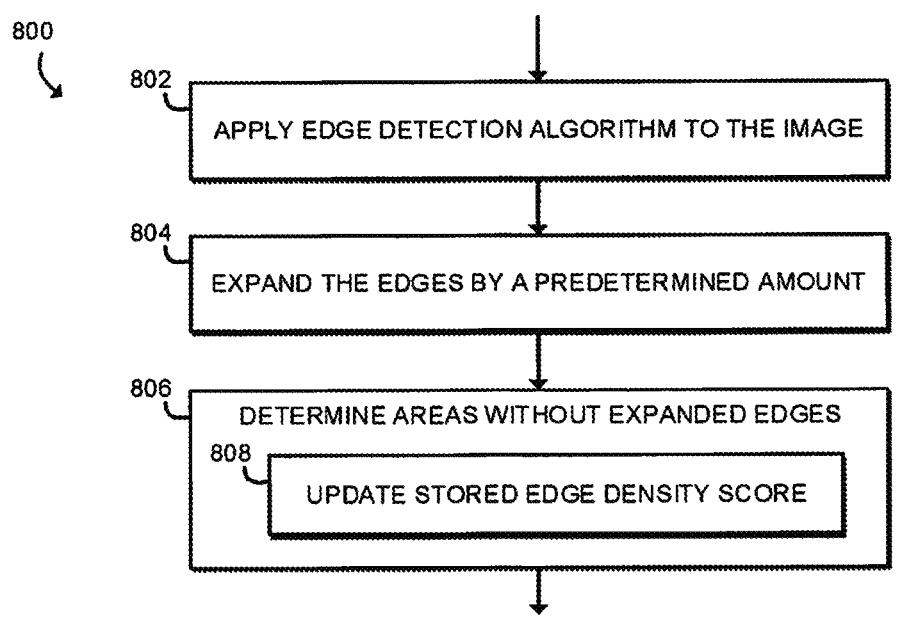
FIG. 8 is a simplified flow diagram of at least one embodiment of a method for processing an image using edge detection that may be executed by the compute device of FIG. 3.

Referring now to FIG. 8, in use, the compute device 102 may perform a method 800 for analyzing one or more images using edge detection. The method 800 begins in block 802 in which the compute device 102 applies an edge detection algorithm to the image. The compute device 102 may apply any suitable edge detection algorithm, such as Canny edge detection.

In block 804, the compute device 102 expands the edges by a predetermined amount. For example, if the edges in block 802 are each 1 pixel wide, the compute device 102 may expand each edge by 10 pixels in all directions. In other embodiments, the compute device 102 may expand each edgy by a different number of pixels, such as anywhere from 1-100 pixels. As various features in the real world that are being imaged are likely to have a high density of edges (such as cracks in the road, road lines, road signs, trees, other vehicles, etc.), applying an edge detection algorithm and then expanding the edges will likely cover most or all of the imaged objects. However, occlusions are likely to lead to portions of an image that have no edges or have a low density of edges.

In block 806, the compute device 102 determines areas of the image that does not have any expanded edges or has an edge density below a predetermined threshold. In block 808, the compute device 102

In block 808, the compute device 102 may update a time-based edge density score that is stored in the compute device for each region of the image. If the edge density is below a predetermined threshold, then the time-based edge density score is decreased by a predetermined amount. If the edge density score is above the predetermined threshold, then the time-based edge density score is increased by a predetermined amount. The compute device 102 may impose a maximum and a minimum value on the time-based edge density score in order to prevent reacting slowly to future changes.

It should be appreciated that the edge density and/or the time-based edge density score may be used to determine the presence of an occlusion in block 526 of the method 500 shown in FIG. 5, such as by comparing the edge density and/or the time-based edge density score to a predetermined threshold.

Figure 9:
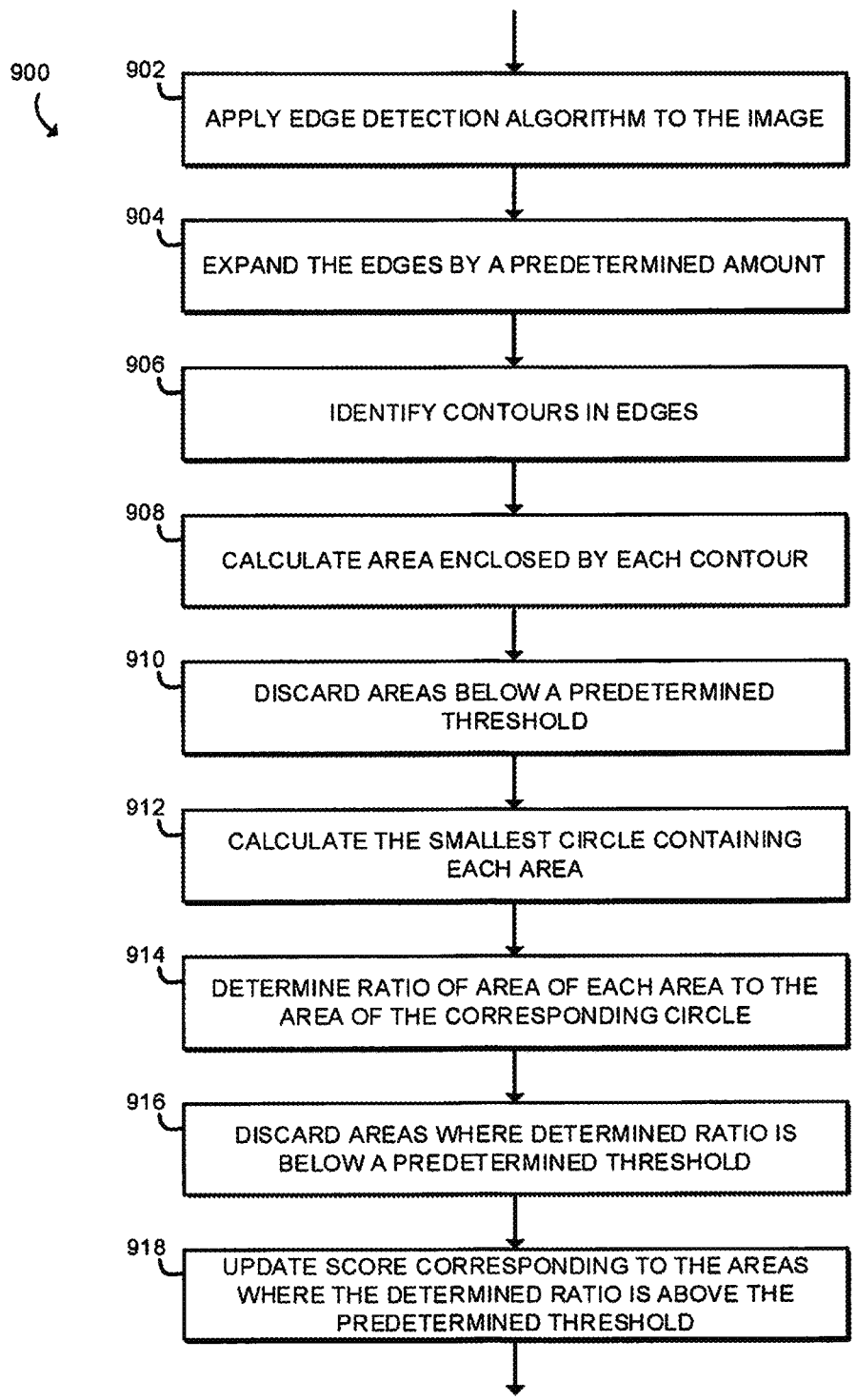
FIG. 9 is a simplified flow diagram of at least one embodiment of a method for processing an image by detecting circular lens artifacts that may be executed by the compute device of FIG. 3.

Referring now to FIG. 9, in use, the compute device 102 may perform a method 900 for analyzing one or more images to look for circular lens artifacts. The method 900 begins in block 902 in which the compute device 102 applies an edge detection algorithm to the image. The compute device 102 may apply any suitable edge detection algorithm, such as Canny edge detection.

In block 904, the compute device 102 expands the edges by a predetermined amount. For example, if the edges in block 902 are each 1 pixel wide, the compute device 102 may expand each edge by 3 pixels in all directions. In other embodiments, the compute device 102 may expand each edgy by a different number of pixels, such as anywhere from 1-100 pixels. As artifacts caused by occlusions are likely to create or nearly create a full loop of edges, expanding the edges is likely to complete some of the loops, making detection easier.

In block 906, the compute device 102 identifies contours in the edges. A contour is an edge that fully encloses an area. For example, an edge that loops around in a circle or near circle would form a contour.

In block 908, the compute device 102 calculates an area enclosed by each contour. The compute device 102 then discards area that are below a predetermined threshold in block 910.

In block 912, the compute device 102 calculates the area of the smallest circle that encloses each of the remaining contours. The compute device determines a ratio of the area of the determined circle to the area enclosed by the corresponding contour in block 916. A high ratio (i.e., a ratio close to one) indicates that the contour is nearly circular. A low ratio (i.e., a ratio close to zero) indicates that the contour is nearly circular. In block 916, the compute device 102 discards areas where the determined ratio is less than a predetermined threshold. The threshold may be any suitable value, such as any value from 0.1-0.9.

In block 918, the compute device 102 updates a circular artifact score corresponding to the areas of the image where the determined ratio is above the predetermined threshold. If the ratio is below a predetermined threshold, then the circular artifact score is decreased by a predetermined amount. If the ratio is above the predetermined threshold, then the circular artifact score is increased by a predetermined amount. The compute device 102 may impose a maximum and a minimum value on the time-based circular artifact score in order to prevent reacting slowly to future changes.

It should be appreciated that the determined ratio and/or the circular artifact score may be used to determine the presence of an occlusion in block 528 of the method 500 shown in FIG. 5, such as by comparing the ratio and/or the circular artifact score to a predetermined threshold.

It should be appreciated that the analysis described in FIGS. 6-9 is merely one possible approach to implementing algorithms using the techniques described herein and that, in some embodiments, different variations techniques may be used. For example, the various scores and time-based scores may be calculated using different techniques, such as using a moving average, a weighted moving average, an exponential moving average, a machine-learning-based algorithm, etc. As another example, pixels may be grouped together when performing certain calculations such as an optical flow, instead of performing the calculations on each individual pixel. In some embodiments, some of the parameters calculated as described above (such as detected edges, differences of optical flow, detected blurriness, and detected circular artifacts) may be provided as input to a machine-learning-based algorithm, which may then predict where occlusions are.

Figure 10:
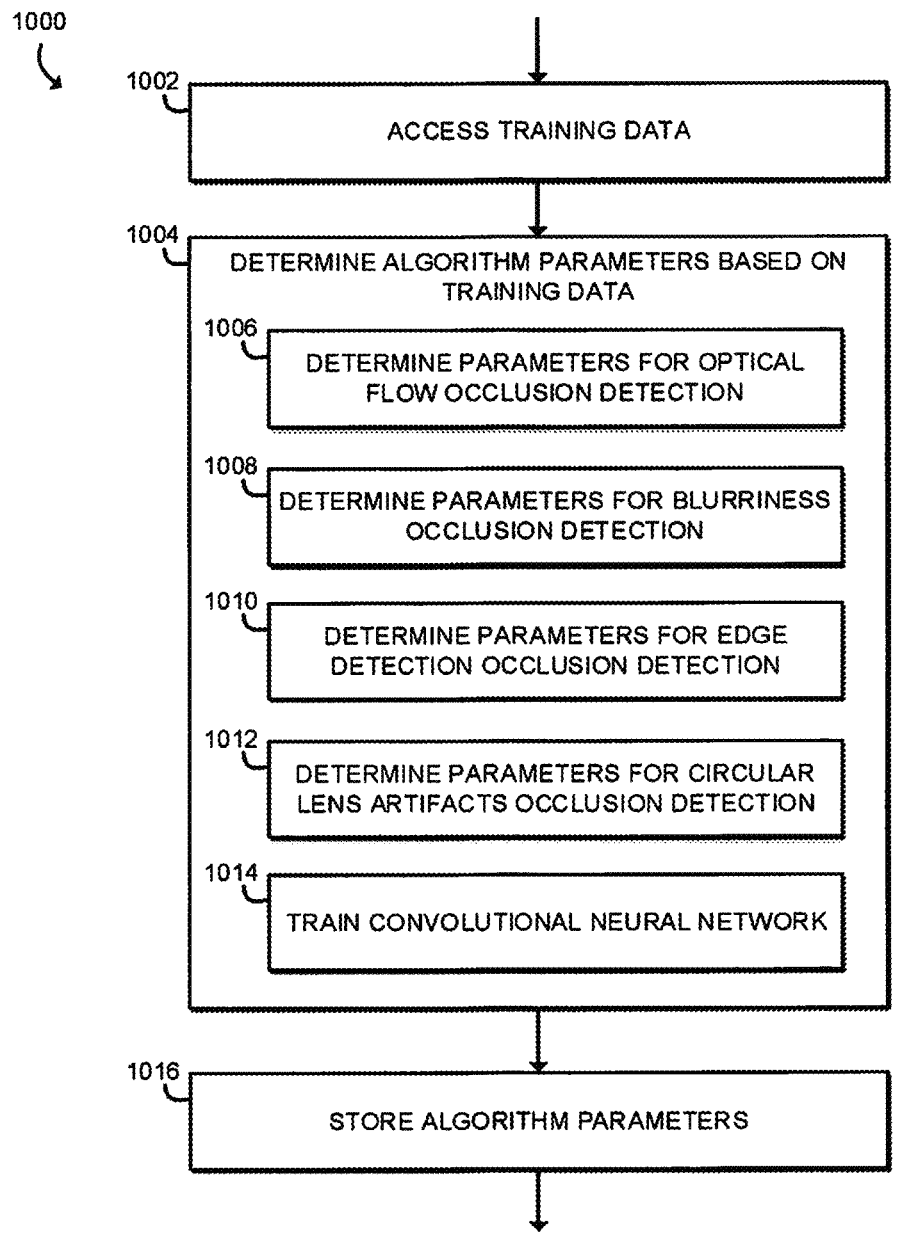
FIG. 10 is a simplified flow diagram of at least one embodiment of a method for determining parameters for occlusion detection algorithms that may be executed by the compute device of FIG. 3.

Referring now to FIG. 10, in use, the compute device 102 may perform a method 1000 for determining parameters for occlusion detection algorithms. The method 1000 begins in block 1002 in which the compute device 102 accesses training data. In the illustrative embodiment, the training data is embodied as labeled training data indicating where occlusions are in training images. It should be appreciated that the training data may include images without occlusions. Additionally or alternatively, in some embodiments, the training data may be include unlabeled training data of training images with and without occlusions where the occlusions are not labeled.

In block 1004, the compute device 102 determines algorithm parameters based on the training data. The compute device 102 may determine parameters for an optical flow occlusion detection algorithm in block 1006, such as thresholds for a flow magnitude indicating a stationary pixel and for a difference in flow magnitude indicating a chaotic point. The compute device 102 may determine parameters for a blurriness occlusion detection algorithm in block 1008, such as a threshold to use for a blurriness score for a region to have a detected occlusion. The compute device 102 may determine parameters for an edge detection-based occlusion detection algorithm in block 1010, such as an amount to expand edges by and a threshold for edge density indicative of an occlusion. The compute device 102 may determine parameters for a circular lens artifact occlusion detection algorithm in block 1012, such as an amount to expand edges by, a threshold area enclosed by a contour to consider a candidate occlusion, and a threshold ratio between the area enclosed by a contour and the smallest circle that can surround the contour. The compute device 102 may also use the training data to train a convolutional neural network in block 1014 that can be used to predict where occlusions are. The compute device 102 then stores the algorithm parameters in block 1016.

It should be appreciated that the parameters determined in the method 1000 can be determined prior to operation of the vehicle 100. In particular, the parameters can be determined remotely from the compute device 102 in the vehicle 100, such as at a remote server, and then sent to the compute device 102 for future use.

Figure 11:
FIG. 11 is one example picture from a camera showing a depiction of optical flow.
Figure 12:
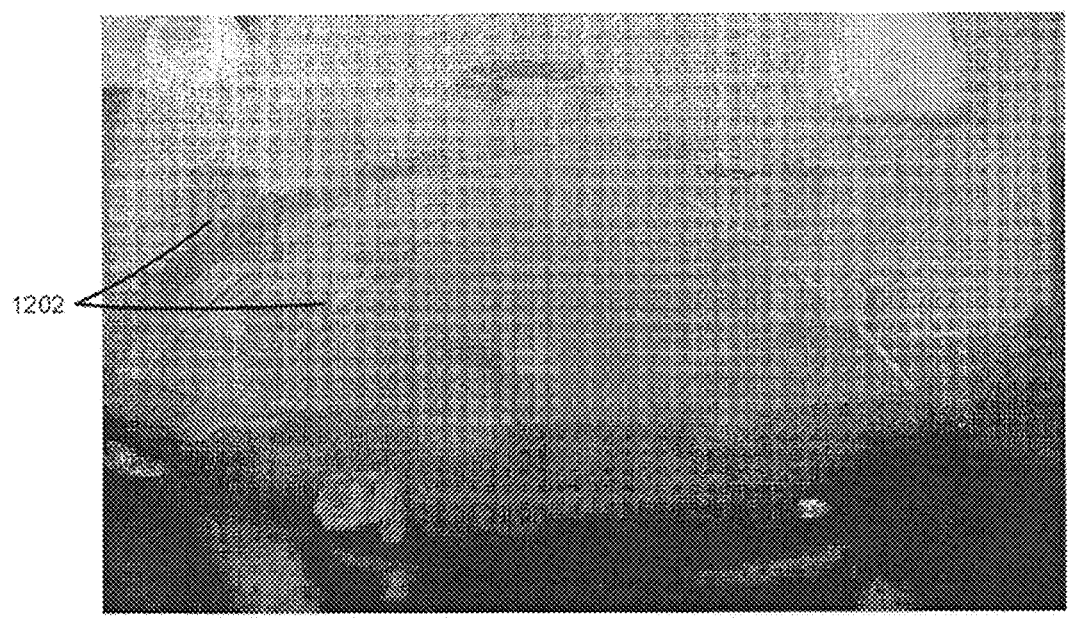
FIG. 12 is another example picture from a camera showing a depiction of optical flow that has changed from the picture in FIG. 11

Referring now to FIGS. 11 &12, in one example, a picture in FIG. 11 shows sample optical flow values for certain regions of the picture, represented by shaded regions such as shaded regions 1102. FIG. 12 shows a sample optical flow for a subsequent picture with shaded regions such as shaded regions 1202. The differences in the shaded regions indicates differences in the optical flow values.

Figure 13:
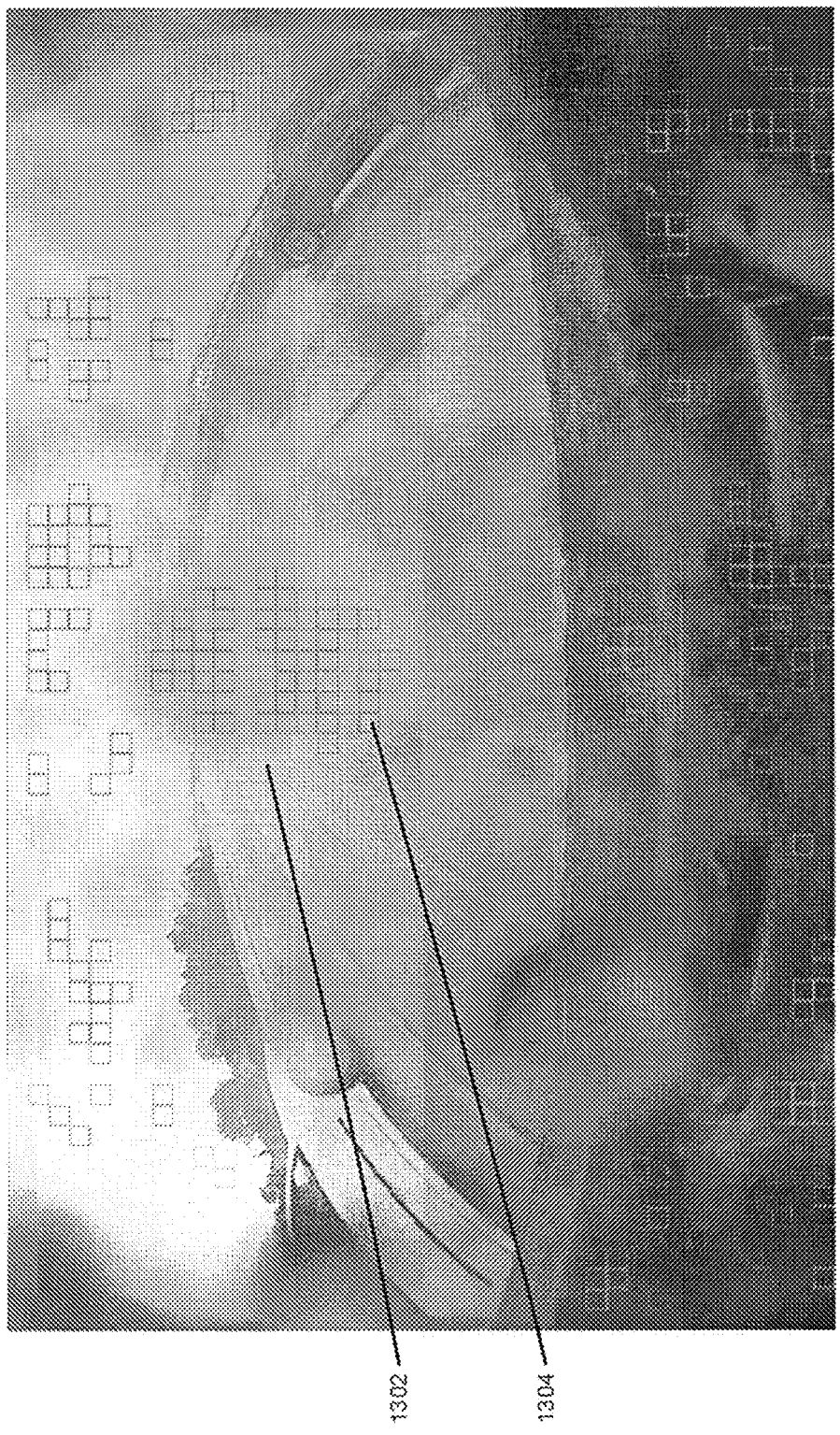
FIG. 13 is one example picture showing a blurriness analysis.

Referring now to FIG. 13, in one example, a picture shown in FIG. 13 shows a blurry region 1302 due to an occlusion. Several subimages such as subimage 1304 have been analyzed and determined to be blurry. The burry subimages or clusters of the blurry subimages may be interpreted as occlusions. It should be appreciated that, in certain cases, some areas such as the sky may be incorrectly determined to be blurry due to a lack of features. For that reason, the sky may be masked out of the image to prevent false positives.

Figure 14:
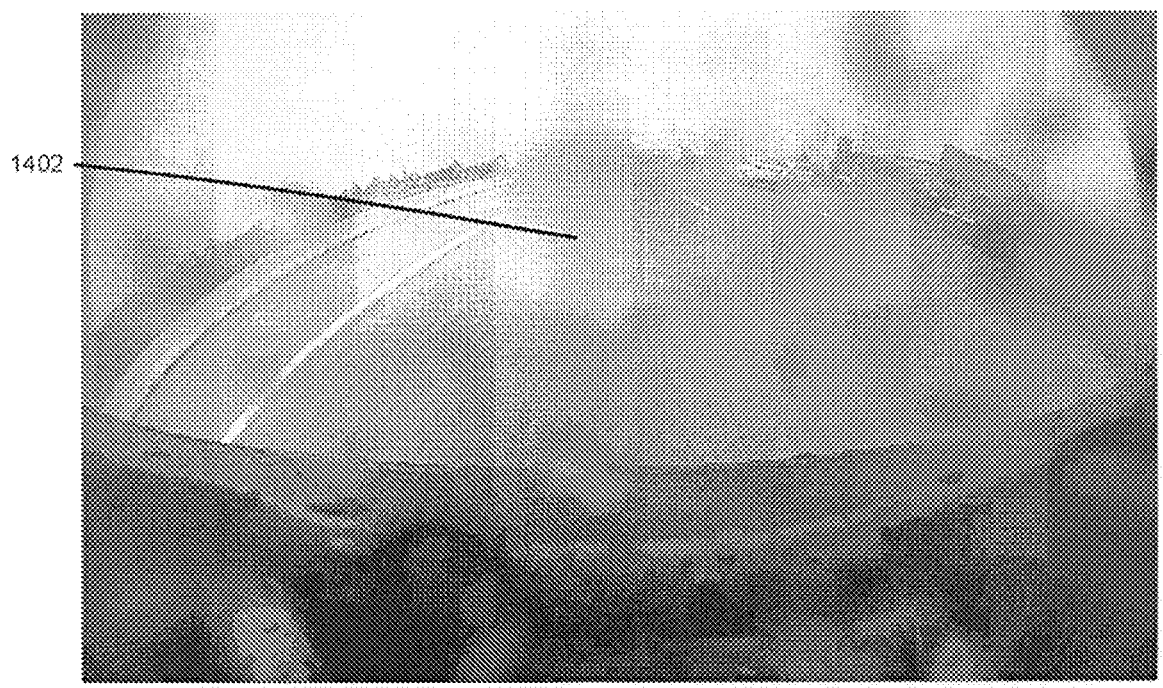
FIG. 14 is one example picture from a camera showing occlusions.
Figure 15:
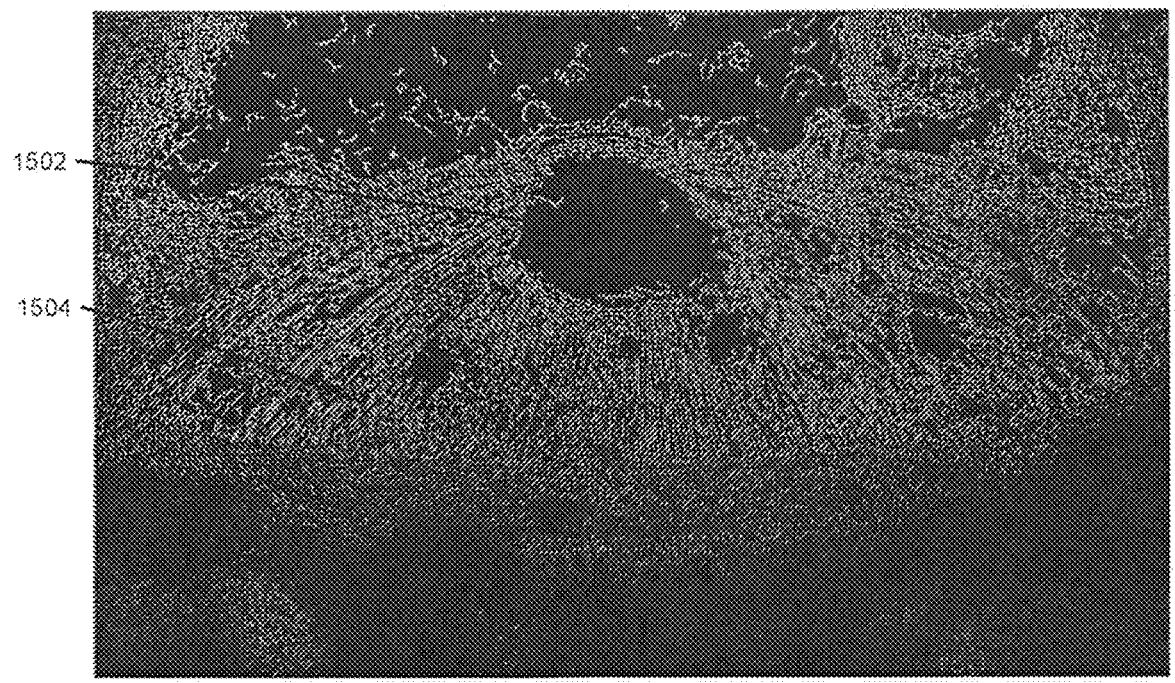
FIG. 15 is an edge detection analysis of the picture from FIG. 14.

Referring now to FIGS. 14 & 15, in one example, a picture shown in FIG. 14 shows a region 1402 that includes an occlusion. FIG. 15 shows that, upon edge detection, the region 1402 with the occlusion has a low density of edges.

Figure 16:
FIG. 16 is one example picture from a camera at night.
Figure 17:
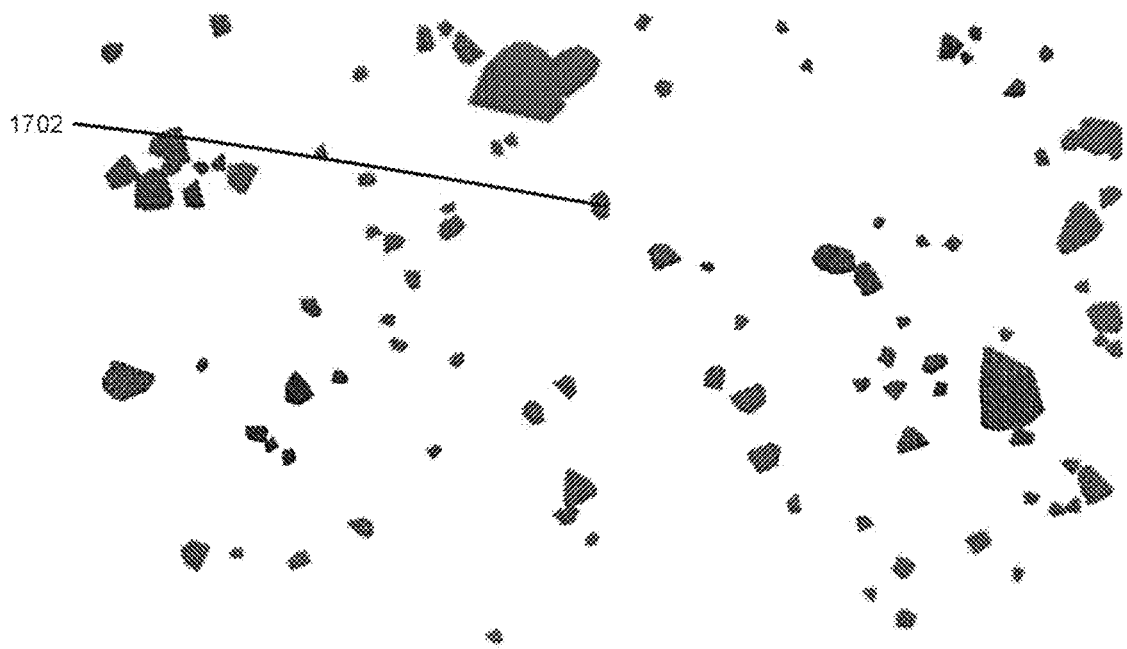
FIG. 17 is an analysis of the picture from FIG. 16 based on detection of circular lens artifacts.

Referring now to FIGS. 16 & 17, in one example, a picture shown in FIG. 16 shows circular lens artifacts such as circular lens artifact 1602. The image is analyzed as described above in regard to FIG. 9 by determining contours that enclose approximately circular areas. The areas that are determined to be enclosed by an approximately circular contour of appropriate size are shown in FIG. 17, such as contour area 1702.

The following numbered clauses include embodiments that are contemplated and non-limiting:

Clause 1. A compute device for detection of occlusions on a camera of a vehicle, the compute device comprising: the camera.

Clause 2. The compute device of clause 1, any other suitable clause, or any suitable combination of clauses, further comprising an occlusion detection module.

Clause 3. The compute device of clause 2, any other suitable clause, or any suitable combination of clauses, wherein the occlusion detection module receives one or more images from the camera of the vehicle.

Clause 4. The compute device of clause 3, any other suitable clause, or any suitable combination of clauses, wherein the occlusion detection module processes the one or more images.

Clause 5. The compute device of clause 4, any other suitable clause, or any suitable combination of clauses, wherein to process the one or more images comprises at least one of determine a change in optical flow based on three images of the one or more images.

Clause 6. The compute device of clause 5, any other suitable clause, or any suitable combination of clauses, wherein to process the one or more images comprises at least one of determine one or more regions of at least one image of the one or more images that are out of focus.

Clause 7. The compute device of clause 6, any other suitable clause, or any suitable combination of clauses, wherein to process the one or more images comprises at least one of perform edge detection on at least one image of the one or more images.

Clause 8. The compute device of clause 7, any other suitable clause, or any suitable combination of clauses, wherein to process the one or more images comprises at least one of detect one or more circular lens artifacts in at least one image of the one or more images.

Clause 9. The compute device of clause 8, any other suitable clause, or any suitable combination of clauses, wherein the occlusion detection module determines, based on the one or more images, one or more occlusions on the camera of the vehicle.

Clause 10. The compute device of clause 9, any other suitable clause, or suitable combination of clauses, wherein to process the one or more images comprises to process one image, wherein to determine, based on the one or more images, the one or more occlusions on the camera of the vehicle comprises to determine, based only on the one image from the camera, the one or more occlusions on the camera of the vehicle.

Clause 11. The compute device of clause 9, any other suitable clause, or suitable combination of clauses, wherein to process the one or more images comprises to process no more than three images, wherein to determine, based on the one or more images, the one or more occlusions on the camera of the vehicle comprises to determine, based only on no more than three images from the camera, the one or more occlusions on the camera of the vehicle.

Clause 12. The compute device of clause 9, any other suitable clause, or suitable combination of clauses, wherein to process the one or more images comprises to determine the change in optical flow based on the three images of the one or more images, wherein to determine the change in optical flow based on the three images comprises: determine a first optical flow between a first image of the three images and a second image of the three images; determine a second optical flow between the second image and a third image of the three images; and determine a difference in optical flow magnitude between the first optical flow and the second optical flow for each of a plurality of pixels, wherein to determine, based on the one or more images, the one or more occlusions on the camera of the vehicle comprises to determine, based on the difference in optical flow magnitude between the first optical flow and the second optical flow for each of a plurality of pixels, the one or more occlusions on the camera of the vehicle.

Clause 13. The compute device of clause 12, any other suitable clause, or suitable combination of clauses, wherein to process the one or more images further comprises to determine a stationary score for each of the plurality of pixels based on the first optical flow, wherein the stationary score for each of the plurality of pixels indicates a magnitude of optical flow in the first optical flow for the corresponding pixel, wherein to determine, based on the one or more images, the one or more occlusions on the camera of the vehicle comprises to determine, based on the stationary score for each of the plurality of pixels, the one or more occlusions on the camera of the vehicle.

Clause 14. The compute device of clause 9, any other suitable clause, or suitable combination of clauses, wherein to process the one or more images comprises to determine the one or more regions of the at least one image that are out of focus, wherein to determine the one or more regions the at least one image that are out of focus comprises: divide the at least one image into a plurality of subimages; and determine, for each of the plurality of subimages, whether the corresponding subimage is blurry, wherein to determine, based on the one or more images, the one or more occlusions on the camera of the vehicle comprises to determine, based on a determination of whether each of the plurality of subimages is blurry, the one or more occlusions on the camera of the vehicle.

Clause 15. The compute device of clause 9, any other suitable clause, or suitable combination of clauses, wherein to process the one or more images comprises to perform edge detection on the at least one image of the one or more images, wherein to process the one or more images further comprises: expand each of a plurality of edges identified in the at least one image during edge detection; and determine areas of at least one image without expanded edges, wherein to determine, based on the one or more images, the one or more occlusions on the camera of the vehicle comprises to determine, based on a determination of areas of the at least one image without expanded edges, the one or more occlusions on the camera of the vehicle.

Clause 16. The compute device of clause 9, any other suitable clause, or suitable combination of clauses, wherein to process the one or more images comprises to detect one or more circular lens artifacts in the at least one image of the one or more images, wherein to detect one or more circular lens artifacts in the at least one image comprises: perform edge detection of the at least one image; identify each of a plurality of contours defined by edge detection; and determine, for each of the plurality of contours, a ratio of a circle enclosing the corresponding contour to an area enclosed by the corresponding contour, wherein to determine, based on the one or more images, the one or more occlusions on the camera of the vehicle comprises to determine, based on a determination of the ratios for each of the plurality of contours.

Clause 17. The compute device of clause 9, any other suitable clause, or suitable combination of clauses, further comprising selecting, based on one or more current conditions of the vehicle, one or more parameters of an occlusion detection algorithm.

Clause 18. The compute device of clause 9, any other suitable clause, or suitable combination of clauses, further comprising applying a mask to the one or more images to block the sky.

Clause 19. A method for detection of occlusions on a camera of a vehicle, the method comprising: receiving, by a compute device, one or more images from the camera of the vehicle.

Clause 20. The method of clause 19, any other suitable clause, or any combination of suitable clauses, further comprising processing, by the compute device, the one or more images.

Clause 21. The method of clause 20, any other suitable clause, or any combination of suitable clauses, wherein processing the one or more images comprises at least one of determining a change in optical flow based on three images of the one or more images.

Clause 22. The method of clause 21, any other suitable clause, or any combination of suitable clauses, wherein processing the one or more images comprises at least one of determining one or more regions of at least one image of the one or more images that are out of focus.

Clause 23. The method of clause 22, any other suitable clause, or any combination of suitable clauses, wherein processing the one or more images comprises at least one of performing edge detection on at least one image of the one or more images.

Clause 24. The method of clause 23, any other suitable clause, or any combination of suitable clauses, wherein processing the one or more images comprises at least one of detecting one or more circular lens artifacts in at least one image of the one or more images.

Clause 25. The method of clause 24, any other suitable clause, or any combination of suitable clauses, further comprising determining, by the compute device and based on the one or more images, one or more occlusions on the camera of the vehicle.

Clause 26. The method of clause 25, any other suitable clause, or suitable combination of clauses, wherein processing the one or more images comprises determining the change in optical flow based on the three images of the one or more images, wherein determining the change in optical flow based on the three images comprises: determining, by the compute device, a first optical flow between a first image of the three images and a second image of the three images; determining, by the compute device, a second optical flow between the second image and a third image of the three images; and determining, by the compute device, a difference in optical flow magnitude between the first optical flow and the second optical flow for each of a plurality of pixels, wherein determining, based on the one or more images, the one or more occlusions on the camera of the vehicle comprises determining, based on the difference in optical flow magnitude between the first optical flow and the second optical flow for each of a plurality of pixels, the one or more occlusions on the camera of the vehicle.

Clause 27. The method of clause 25, any other suitable clause, or suitable combination of clauses, wherein processing the one or more images comprises determining the one or more regions of the at least one image that are out of focus, wherein determining the one or more regions the at least one image that are out of focus comprises: dividing, by the compute device, the at least one image into a plurality of subimages; and determining, by the compute device and for each of the plurality of subimages, whether the corresponding subimage is blurry, wherein determining, based on the one or more images, the one or more occlusions on the camera of the vehicle comprises determining, based on a determination of whether each of the plurality of subimages is blurry, the one or more occlusions on the camera of the vehicle.

Clause 28. The method of clause 25, any other suitable clause, or suitable combination of clauses, wherein processing the one or more images comprises performing edge detection on the at least one image of the one or more images, wherein processing the one or more images further comprises: expanding, by the compute device, each of a plurality of edges identified in the at least one image during edge detection; and determining, by the compute device, areas of at least one image without expanded edges, wherein determining, based on the one or more images, the one or more occlusions on the camera of the vehicle comprises determining, based on a determination of areas of the at least one image without expanded edges, the one or more occlusions on the camera of the vehicle.

Clause 29. The method of clause 25, any other suitable clause, or suitable combination of clauses, wherein processing the one or more images comprises detecting one or more circular lens artifacts in the at least one image of the one or more images, wherein detecting one or more circular lens artifacts in the at least one image comprises: performing, by the compute device, edge detection of the at least one image; identifying, by the compute device, each of a plurality of contours defined by edge detection; and determining, by the compute device and for each of the plurality of contours, a ratio of a circle enclosing the corresponding contour to an area enclosed by the corresponding contour, wherein determining, based on the one or more images, the one or more occlusions on the camera of the vehicle comprises determining, based on a determination of the ratios for each of the plurality of contours.

Clause 30. One or more non-transitory computer-readable media comprising a plurality of instructions stored thereon that, when executed, causes a compute device to: receive one or more images from a camera of a vehicle.

Clause 31. The one or more non-transitory computer-readable media of clause 30, any other suitable clause, or suitable combination of clauses, wherein the compute device is caused to process one or more images.

Clause 32. The one or more non-transitory computer-readable media of clause 31, any other suitable clause, or suitable combination of clauses, wherein to process the one or more images comprises at least one of determining a change in optical flow based on three images of the one or more images.

Clause 33. The one or more non-transitory computer-readable media of clause 32, any other suitable clause, or suitable combination of clauses, wherein to process the one or more images comprises at least one of determining one or more regions of at least one image of the one or more images that are out of focus.

Clause 34. The one or more non-transitory computer-readable media of clause 33, any other suitable clause, or suitable combination of clauses, wherein to process the one or more images comprises at least one of performing edge detection on at least one image of the one or more images.

Clause 35. The one or more non-transitory computer-readable media of clause 34, any other suitable clause, or suitable combination of clauses, wherein to process the one or more images comprises at least one of detecting one or more circular lens artifacts in at least one image of the one or more images.

Clause 36. The one or more non-transitory computer-readable media of clause 35, any other suitable clause, or suitable combination of clauses, wherein the compute device is caused to determine, based on the one or more images, one or more occlusions on the camera of the vehicle.

Clause 37. The one or more non-transitory computer-readable media of clause 36, any other suitable clause, or suitable combination of clauses, wherein to process the one or more images comprises to determine the change in optical flow based on the three images of the one or more images, wherein to determine the change in optical flow based on the three images comprises: determine a first optical flow between a first image of the three images and a second image of the three images; determine a second optical flow between the second image and a third image of the three images; and determine a difference in optical flow magnitude between the first optical flow and the second optical flow for each of a plurality of pixels, wherein to determine, based on the one or more images, the one or more occlusions on the camera of the vehicle comprises to determine, based on the difference in optical flow magnitude between the first optical flow and the second optical flow for each of a plurality of pixels, the one or more occlusions on the camera of the vehicle.

Clause 38. The one or more non-transitory computer-readable media of clause 36, any other suitable clause, or suitable combination of clauses, wherein to process the one or more images comprises to determine the one or more regions of the at least one image that are out of focus, wherein to determine the one or more regions the at least one image that are out of focus comprises: divide the at least one image into a plurality of subimages; and determine, for each of the plurality of subimages, whether the corresponding subimage is blurry, wherein to determine, based on the one or more images, the one or more occlusions on the camera of the vehicle comprises to determine, based on a determination of whether each of the plurality of subimages is blurry, the one or more occlusions on the camera of the vehicle.

Clause 39. The one or more non-transitory computer-readable media of clause 36, any other suitable clause, or suitable combination of clauses, wherein to process the one or more images comprises to perform edge detection on the at least one image of the one or more images, wherein to process the one or more images further comprises: expand each of a plurality of edges identified in the at least one image during edge detection; and determine areas of at least one image without expanded edges, wherein to determine, based on the one or more images, the one or more occlusions on the camera of the vehicle comprises to determine, based on a determination of areas of the at least one image without expanded edges, the one or more occlusions on the camera of the vehicle.

Clause 40. The one or more non-transitory computer-readable media of clause 36, any other suitable clause, or suitable combination of clauses, wherein to process the one or more images comprises to detect one or more circular lens artifacts in the at least one image of the one or more images, wherein to detect one or more circular lens artifacts in the at least one image comprises: perform edge detection of the at least one image; identify each of a plurality of contours defined by edge detection; and determine, for each of the plurality of contours, a ratio of a circle enclosing the corresponding contour to an area enclosed by the corresponding contour, wherein to determine, based on the one or more images, the one or more occlusions on the camera of the vehicle comprises to determine, based on a determination of the ratios for each of the plurality of contours.

The invention claimed is:

1. A compute device for detection of occlusions on a camera of a vehicle, the compute device comprising:
   the camera;
   an occlusion detection module to:
      receive one or more images from the camera of the vehicle;
      process the one or more images, wherein to process the one or more images comprises at least one of (i) determine a change in optical flow based on three images of the one or more images, (ii) determine one or more regions of at least one image of the one or more images that are out of focus, (iii) perform edge detection on at least one image of the one or more images, and (iv) detect one or more circular lens artifacts in at least one image of the one or more images; and
      determine, based on the one or more images, one or more occlusions on the camera of the vehicle;
   wherein to process the one or more images comprises to determine the change in optical flow based on the three images of the one or more images, wherein to determine the change in optical flow based on the three images comprises to: (i) determine a first optical flow between a first image of the three images and a second image of the three images, (ii) determine a second optical flow between the second image and a third image of the three images, and (iii) determine a difference in optical flow magnitude between the first optical flow and the second optical flow for each of a plurality of pixels; and
   wherein to determine, based on the one or more images, the one or more occlusions on the camera of the vehicle comprises to determine, based on the difference in optical flow magnitude between the first optical flow and the second optical flow for each of a plurality of pixels, the one or more occlusions on the camera of the vehicle.

2. The compute device of claim 1, wherein to process the one or more images comprises to process one image,
   wherein to determine, based on the one or more images, the one or more occlusions on the camera of the vehicle comprises to determine, based only on the one image from the camera, the one or more occlusions on the camera of the vehicle.

3. The compute device of claim 1, wherein to process the one or more images comprises to process no more than three images,
   wherein to determine, based on the one or more images, the one or more occlusions on the camera of the vehicle comprises to determine, based only on no more than three images from the camera, the one or more occlusions on the camera of the vehicle.

4. The compute device of claim 1, wherein to process the one or more images further comprises to determine a stationary score for each of the plurality of pixels based on the first optical flow, wherein the stationary score for each of the plurality of pixels indicates a magnitude of optical flow in the first optical flow for the corresponding pixel,
wherein to determine, based on the one or more images, the one or more occlusions on the camera of the vehicle comprises to determine, based on the stationary score for each of the plurality of pixels, the one or more occlusions on the camera of the vehicle.

5. The compute device of claim 1, wherein to process the one or more images comprises to determine the one or more regions of the at least one image that are out of focus, wherein to determine the one or more regions of the at least one image that are out of focus comprises:
divide the at least one image into a plurality of subimages; and
determine, for each of the plurality of subimages, whether the corresponding subimage is blurry,
wherein to determine, based on the one or more images, the one or more occlusions on the camera of the vehicle comprises to determine, based on a determination of whether each of the plurality of subimages is blurry, the one or more occlusions on the camera of the vehicle.

6. The compute device of claim 1, wherein to process the one or more images comprises to perform edge detection on the at least one image of the one or more images, wherein to process the one or more images further comprises:
expand each of a plurality of edges identified in the at least one image during edge detection; and
determine areas of at least one image without expanded edges,
wherein to determine, based on the one or more images, the one or more occlusions on the camera of the vehicle comprises to determine, based on a determination of areas of the at least one image without expanded edges, the one or more occlusions on the camera of the vehicle.

7. The compute device of claim 1, wherein to process the one or more images comprises to detect one or more circular lens artifacts in the at least one image of the one or more images, wherein to detect one or more circular lens artifacts in the at least one image comprises:
perform edge detection of the at least one image;
identify each of a plurality of contours defined by edge detection; and
determine, for each of the plurality of contours, a ratio of a circle enclosing the corresponding contour to an area enclosed by the corresponding contour,
wherein to determine, based on the one or more images, the one or more occlusions on the camera of the vehicle comprises to determine, based on a determination of the ratios for each of the plurality of contours.

8. The compute device of claim 1, further comprising selecting, based on one or more current conditions of the vehicle, one or more parameters of an occlusion detection algorithm.

9. The compute device of claim 1, further comprising applying a mask to the one or more images to block the sky.

10. A method for detection of occlusions on a camera of a vehicle, the method comprising:
receiving, by a compute device, one or more images from the camera of the vehicle;
processing, by the compute device, the one or more images, wherein processing the one or more images comprises at least one of (i) determining a change in optical flow based on three images of the one or more images, (ii) determining one or more regions of at least one image of the one or more images that are out of focus, (iii) performing edge detection on at least one image of the one or more images, and (iv) detecting one or more circular lens artifacts in at least one image of the one or more images; and
determining, by the compute device and based on the one or more images, one or more occlusions on the camera of the vehicle;
wherein processing the one or more images comprises determining the change in optical flow based on the three images of the one or more images, wherein determining the change in optical flow based on the three images comprises (i) determining, by the compute device, a first optical flow between a first image of the three images and a second image of the three images, (ii) determining, by the compute device, a second optical flow between the second image and a third image of the three images, and (iii) determining, by the compute device, a difference in optical flow magnitude between the first optical flow and the second optical flow for each of a plurality of pixels; and
wherein determining, based on the one or more images, the one or more occlusions on the camera of the vehicle comprises determining, based on the difference in optical flow magnitude between the first optical flow and the second optical flow for each of a plurality of pixels, the one or more occlusions on the camera of the vehicle.

11. The method of claim 10, wherein processing the one or more images comprises determining the one or more regions of the at least one image that are out of focus, wherein determining the one or more regions of the at least one image that are out of focus comprises:
dividing, by the compute device, the at least one image into a plurality of subimages; and
determining, by the compute device and for each of the plurality of subimages, whether the corresponding subimage is blurry,
wherein determining, based on the one or more images, the one or more occlusions on the camera of the vehicle comprises determining, based on a determination of whether each of the plurality of subimages is blurry, the one or more occlusions on the camera of the vehicle.

12. The method of claim 10, wherein processing the one or more images comprises performing edge detection on the at least one image of the one or more images, wherein processing the one or more images further comprises:
expanding, by the compute device, each of a plurality of edges identified in the at least one image during edge detection; and
determining, by the compute device, areas of at least one image without expanded edges,
wherein determining, based on the one or more images, the one or more occlusions on the camera of the vehicle comprises determining, based on a determination of areas of the at least one image without expanded edges, the one or more occlusions on the camera of the vehicle.

13. The method of claim 10, wherein processing the one or more images comprises detecting one or more circular lens artifacts in the at least one image of the one or more images, wherein detecting one or more circular lens artifacts in the at least one image comprises:

performing, by the compute device, edge detection of the at least one image;

identifying, by the compute device, each of a plurality of contours defined by edge detection; and determining, by the compute device and for each of the plurality of contours, a ratio of a circle enclosing the corresponding contour to an area enclosed by the corresponding contour, wherein determining, based on the one or more images, the one or more occlusions on the camera of the vehicle comprises determining, based on a determination of the ratios for each of the plurality of contours.

14. One or more non-transitory computer-readable media comprising a plurality of instructions stored thereon that, when executed, causes a compute device to:

receive one or more images from a camera of a vehicle;

process one or more images, wherein to process the one or more images comprises at least one of (i) determining a change in optical flow based on three images of the one or more images, (ii) determining one or more regions of at least one image of the one or more images that are out of focus, (iii) performing edge detection on at least one image of the one or more images, and (iv) detecting one or more circular lens artifacts in at least one image of the one or more images; and determine, based on the one or more images, one or more occlusions on the camera of the vehicle;

wherein to process the one or more images comprises to determine the change in optical flow based on the three images of the one or more images, wherein to determine the change in optical flow based on the three images comprises to (i) determine a first optical flow between a first image of the three images and a second image of the three images, (ii) determine a second optical flow between the second image and a third image of the three images, and (iii) determine a difference in optical flow magnitude between the first optical flow and the second optical flow for each of a plurality of pixels;

wherein to determine, based on the one or more images, the one or more occlusions on the camera of the vehicle comprises to determine, based on the difference in optical flow magnitude between the first optical flow and the second optical flow for each of a plurality of pixels, the one or more occlusions on the camera of the vehicle.

15. The one or more non-transitory computer-readable media of claim 14, wherein to process the one or more images comprises to determine the one or more regions of the at least one image that are out of focus, wherein to determine the one or more regions of the at least one image that are out of focus comprises:

divide the at least one image into a plurality of subimages; and determine, for each of the plurality of subimages, whether the corresponding subimage is blurry, wherein to determine, based on the one or more images, the one or more occlusions on the camera of the vehicle comprises to determine, based on a determination of whether each of the plurality of subimages is blurry, the one or more occlusions on the camera of the vehicle.

16. The one or more non-transitory computer-readable media of claim 14, wherein to process the one or more images comprises to perform edge detection on the at least one image of the one or more images, wherein to process the one or more images further comprises:

expand each of a plurality of edges identified in the at least one image during edge detection; and determine areas of at least one image without expanded edges, wherein to determine, based on the one or more images, the one or more occlusions on the camera of the vehicle comprises to determine, based on a determination of areas of the at least one image without expanded edges, the one or more occlusions on the camera of the vehicle.

17. The one or more non-transitory computer-readable media of claim 14, wherein to process the one or more images comprises to detect one or more circular lens artifacts in the at least one image of the one or more images, wherein to detect one or more circular lens artifacts in the at least one image comprises:

perform edge detection of the at least one image;

identify each of a plurality of contours defined by edge detection; and determine, for each of the plurality of contours, a ratio of a circle enclosing the corresponding contour to an area enclosed by the corresponding contour, wherein to determine, based on the one or more images, the one or more occlusions on the camera of the vehicle comprises to determine, based on a determination of the ratios for each of the plurality of contours.

\* \* \* \* \*